United States Patent
Kojima

(10) Patent No.: US 7,966,036 B2
(45) Date of Patent: Jun. 21, 2011

(54) WIRELESS LAN DEVICE AND COMMUNICATION MODE SWITCHING METHOD

(75) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 362 days.

(21) Appl. No.: 11/395,722

(22) Filed: Mar. 31, 2006

(65) Prior Publication Data

US 2007/0140191 A1 Jun. 21, 2007

(30) Foreign Application Priority Data

Dec. 16, 2005 (JP) ................................ 2005-362847

(51) Int. Cl.
  *H04M 1/00* (2006.01)
  *H04B 7/00* (2006.01)
  *H04W 4/00* (2009.01)
  *H04L 12/28* (2006.01)
(52) U.S. Cl. .................... 455/552.1; 455/41.2; 370/338; 370/341; 370/398; 370/401; 370/431
(58) Field of Classification Search .................. 370/338, 370/329, 341, 398, 401, 431; 455/552.1, 455/41.2
See application file for complete search history.

(56) References Cited

U.S. PATENT DOCUMENTS

| | | | | |
|---|---|---|---|---|
| 5,870,385 A | * | 2/1999 | Ahmadi et al. | 370/252 |
| 5,898,690 A | * | 4/1999 | Masashi | 370/401 |
| 2002/0080736 A1 | * | 6/2002 | Furukawa | 370/328 |
| 2002/0098847 A1 | * | 7/2002 | Benveniste | 455/452 |
| 2003/0144003 A1 | * | 7/2003 | Ranta et al. | 455/450 |
| 2004/0063458 A1 | * | 4/2004 | Hori et al. | 455/554.2 |
| 2004/0120323 A1 | * | 6/2004 | Viikari et al. | 370/395.5 |
| 2005/0100029 A1 | * | 5/2005 | Das | 370/401 |
| 2006/0215576 A1 | * | 9/2006 | Yu et al. | 370/252 |
| 2008/0144569 A1 | * | 6/2008 | Orlassino et al. | 370/329 |

FOREIGN PATENT DOCUMENTS

| | | |
|---|---|---|
| JP | 8-294170 A | 11/1996 |
| JP | 2004-72565 | 3/2004 |
| JP | 2004-072565 | 3/2004 |
| JP | 2004-248180 | 9/2004 |

OTHER PUBLICATIONS

Japanese Office Action, mailed by JPO and corresponding to Japanese application No. 2005-362847 on Apr. 27, 2010, with partial English translation.

* cited by examiner

*Primary Examiner* — Ariel Balaoing
(74) *Attorney, Agent, or Firm* — Fujitsu Patent Center

(57) ABSTRACT

A wireless LAN device for lessening failure in switching from infrastructure mode to ad-hoc mode. A radio wave coverage storage stores coverage information about coverage of radio waves amongst access points. A terminal information storage stores terminal information about terminals associated with the access points. A packet receiver receives, via the access points, a packet transmitted from any of the terminals in infrastructure mode. An access point acquisition unit looks up the terminal information storage, based on terminal information about originating and destination terminals contained in the packet, to identify access points with which the terminals are associated. A radio wave coverage decision unit looks up the radio wave coverage storage to determine whether the identified access points are within each other's coverage of radio waves. A communication mode switch switches the communication mode of the originating and destination terminals to ad-hoc mode in accordance with the determination result.

12 Claims, 23 Drawing Sheets

| AP | Ad-hoc AP |
|---|---|
| AP1 | AP2,AP4 |
| AP2 | AP1,AP3 |
| AP3 | AP2 |
| AP4 | AP1 |

| AP | Associated MS |
|---|---|
| AP1 | MS1 |
| AP2 | MS2 |
| AP3 | MS3 |
| AP4 | MS4 |

| Communication Failure List |
|---|
| MS1,MS4 |
| ⋮ |

FIG. 12

| Communication Failure List | Time (h:m:s) |
|---|---|
| MS1,MS4 | a:b:c |
| ⋮ | ⋮ |

WIRELESS LAN DEVICE AND COMMUNICATION MODE SWITCHING METHOD

CROSS-REFERENCE TO RELATED APPLICATIONS

This application is based upon and claims the benefits of priority from the prior Japanese Patent Application No. 2005-362847 filed Dec. 16, 2005, the entire contents of which are incorporated herein by reference.

BACKGROUND OF THE INVENTION

1. Field of the Invention

The present invention relates to wireless LAN devices and communication mode switching methods, and more particularly, to a wireless LAN device for controlling a plurality of access points and a communication mode switching method for such a wireless LAN device.

2. Description of the Related Art

Wireless LAN (Local Area Network) is known as a typical example of networks enabling wireless communication between terminals. Representative specifications of wireless LANs have been formulated by the IEEE (Institute of Electrical and Electronic Engineers) as IEEE 802.11a, IEEE 802.11b/g, etc. Currently, these types of wireless LANs are widely used at homes and in offices.

Wireless LANs are configured in either of two modes, namely, infrastructure mode and ad-hoc mode. In infrastructure mode, the network is constituted by a base station called access point (AP), and a terminal called mobile station (MS) which is within the coverage of radio waves.

FIG. 21 exemplifies a network operating in infrastructure mode. An access point 203 is connected, for example, to a wired Ethernet (registered trademark) backbone network 201. To the backbone network 201 is connected a terminal (station; in the figure, ST) 202 for performing wired communications. The access point 203 communicates by wireless with mobile stations 204a and 204b associated therewith to allow exchange of packets between the mobile stations 204a and 204b and between the mobile station 204a, 204b and the station 202.

Ad-hoc mode, by contrast, requires no access point and the network is constituted by mobile stations only.

FIG. 22 exemplifies a network operating in ad-hoc mode. Mobile stations 211a and 211b directly exchange packets with each other by wireless, without through the agency of an access point. In the figure, the ellipses indicate the radio wave coverage areas of the respective mobile stations 211a and 211b.

There have been known conventional techniques wherein mobile stations associated with an identical access point are switched from infrastructure mode in which the mobile stations communicate via the access point to ad-hoc mode in which the mobile stations directly communicate with each other (e.g., Unexamined Japanese Patent Publication No. 2004-72565). The advantages of switching communication from infrastructure mode to ad-hoc mode are saving of wireless band and reduction of delay. For example, mobile stations associated with a certain access point communicate with each other using a channel other than the wireless frequency band (wireless channel, channel) used by the access point, in which case other mobile stations operating in infrastructure mode have more chance of using the channel of the access point, thus saving the wireless band. Also, the mobile stations which have been switched to ad-hoc mode directly communicate with each other without through the agency of the access point, whereby delay in communication between the mobile stations can be reduced.

Meanwhile, neighboring access points are generally adapted to use different channels. A mobile station belonging to a certain access point is unable to receive radio waves from other access points or detect a mobile station communicating using radio waves of a different access point and thus cannot switch into ad-hoc mode to communicate with such a mobile station. Accordingly, a mobile station regularly performs frequency scanning to receive radio waves of other access points than that to which the mobile station belongs so that the mobile station can switch into ad-hoc mode to communicate with a mobile station associated with a different access point. During the scanning, the mobile station is unable to communicate in infrastructure mode, thus causing overhead. Also, the scanning is basically conducted at regular intervals for updating, and therefore, a time lag inevitably occurs in the case where a new mobile station has been added. Further, where the switching to ad-hoc mode is triggered by mobile stations, in many cases the mobile stations themselves decide to switch to ad-hoc mode in a distributed autonomous manner, which makes it difficult to ensure security as compared with the case of centralized management.

In recent years, wireless LAN switches (also known as wireless LAN controllers) for centralized control of multiple access points have appeared on the market. A wireless LAN switch is capable of centralized management of the statuses (authentication information, encryption information, wireless information) of a plurality of access points. Typical products include those from Meru Corporation, Aruba Corporation, and Airespace Corporation. As functionality for the management of wireless information, a wireless LAN switch has an auto-calibration function whereby interference of radio waves between access points, etc. are measured to estimate and instruct the locations of individual access points, to set channels for the access points, and to automatically set the radio wave transmission powers of the individual access points.

The wireless LAN switch thus manages the statuses of multiple access points and, therefore, is capable of switching the communication mode of mobile stations associated with different access points from infrastructure mode to ad-hoc mode. For example, on detection of infrastructure mode communication between mobile stations associated with different access points, the wireless LAN switch switches the communication mode of the mobile stations to ad-hoc mode.

FIG. 23 illustrates the switching of the communication mode by such a wireless LAN switch. In the figure, a mobile station 224a is communicating with an access point 223a in infrastructure mode by using a channel Ch1, a mobile station 224b is communicating with an access point 223b in infrastructure mode by using a channel Ch6, and a mobile station 224c is communicating with an access point 223c in infrastructure mode by using a channel Ch11. The wireless LAN switch 222 is connected to a backbone network 221. Also, the wireless LAN switch is connected to the access points 223a to 223c by wire for the centralized management of the access points 223a to 223c.

Based on the address (e.g., MAC (Media Access Control) address) of a packet transferred in a direction indicated by the arrow A1 in the figure, for example, the wireless LAN switch detects the communication originating from the mobile station 224a associated with the access point 223a and terminating at the mobile station 224c associated with the access point 223c and judges that the communication should be switched to ad-hoc mode. Subsequently, the wireless LAN switch 222 transmits an ad-hoc mode switching instruction to each of the mobile stations 224a and 224c, as indicated by the arrows B1a and B1b. The ad-hoc mode switching instruction contains settings information necessary for the mobile stations 224a and 224c to communicate in ad-hoc mode. The settings information includes, for example, IBSSID (Independent Basic Service Set Identifier), ad-hoc communication service channel, and authentication information/encryption information for ad-hoc communication, though the contents somewhat vary depending on the implementation. IBSSID is the identifier of an ad-hoc communication network and is uniquely assigned to each of ad-hoc mode networks created.

Thus, by switching the communication of mobile stations from infrastructure mode to ad-hoc mode, it is possible to save the wireless band on more occasions and also to reduce delay.

When communication between mobile stations associated with different access points is detected, however, the communication is unconditionally switched from infrastructure mode to ad-hoc mode. Accordingly, the switching from infrastructure mode to ad-hoc mode is tried even in cases where the mobile stations are not within each other's coverage of radio waves, giving rise to the problem that the switching often ends in failure.

For example, let it be assumed that the mobile stations 224a and 224c in FIG. 23 are so distant from each other that they are not within each other's coverage of radio waves. In this case, as the mobile station 224a starts to communicate with the mobile station 224c in infrastructure mode, the wireless LAN switch 222 instructs the mobile stations 224a and 224c to switch to ad-hoc mode. However, since the mobile stations 224a and 224c are not within each other's coverage of radio waves, ad-hoc mode communication fails in the end.

SUMMARY OF THE INVENTION

The present invention was created in view of the above circumstances, and an object thereof is to provide a wireless LAN device and a communication mode switching method whereby failure in the switching from infrastructure mode to ad-hoc mode can be lessened.

To achieve the object, the present invention provides a wireless LAN device for controlling a plurality of access points. The wireless LAN device comprises a radio wave coverage storage for storing radio wave coverage information about coverage of radio waves amongst the access points, a terminal information storage for storing terminal information about terminals associated with the individual access points, a packet receiver for receiving, via the access points, a packet transmitted from any of the terminals in infrastructure mode, an access point acquisition unit for looking up the terminal information storage, based on terminal information about an originating terminal and a destination terminal contained in the packet, to identify an access point with which the originating terminal is associated and an access point with which the destination terminal is associated, a radio wave coverage decision unit for looking up the radio wave coverage storage, to determine whether or not the access points with which the originating terminal and the destination terminal are respectively associated are within each other's coverage of radio waves, and a communication mode switch for switching mode of communication between the originating terminal and the destination terminal to ad-hoc mode in accordance with a result of the determination by the radio wave coverage decision unit.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 shows an exemplary data structure of an ad-hoc access point list.

FIG. 4 shows an exemplary data structure of an access point-mobile station association list.

FIG. 12 shows an exemplary data structure of a communication failure list storage.

FIG. 13 shows another exemplary data structure of the communication failure list storage.

DESCRIPTION OF THE PREFERRED EMBODIMENTS

The principles of the present invention will be described below with reference to the accompanying drawings.

Figure 1:
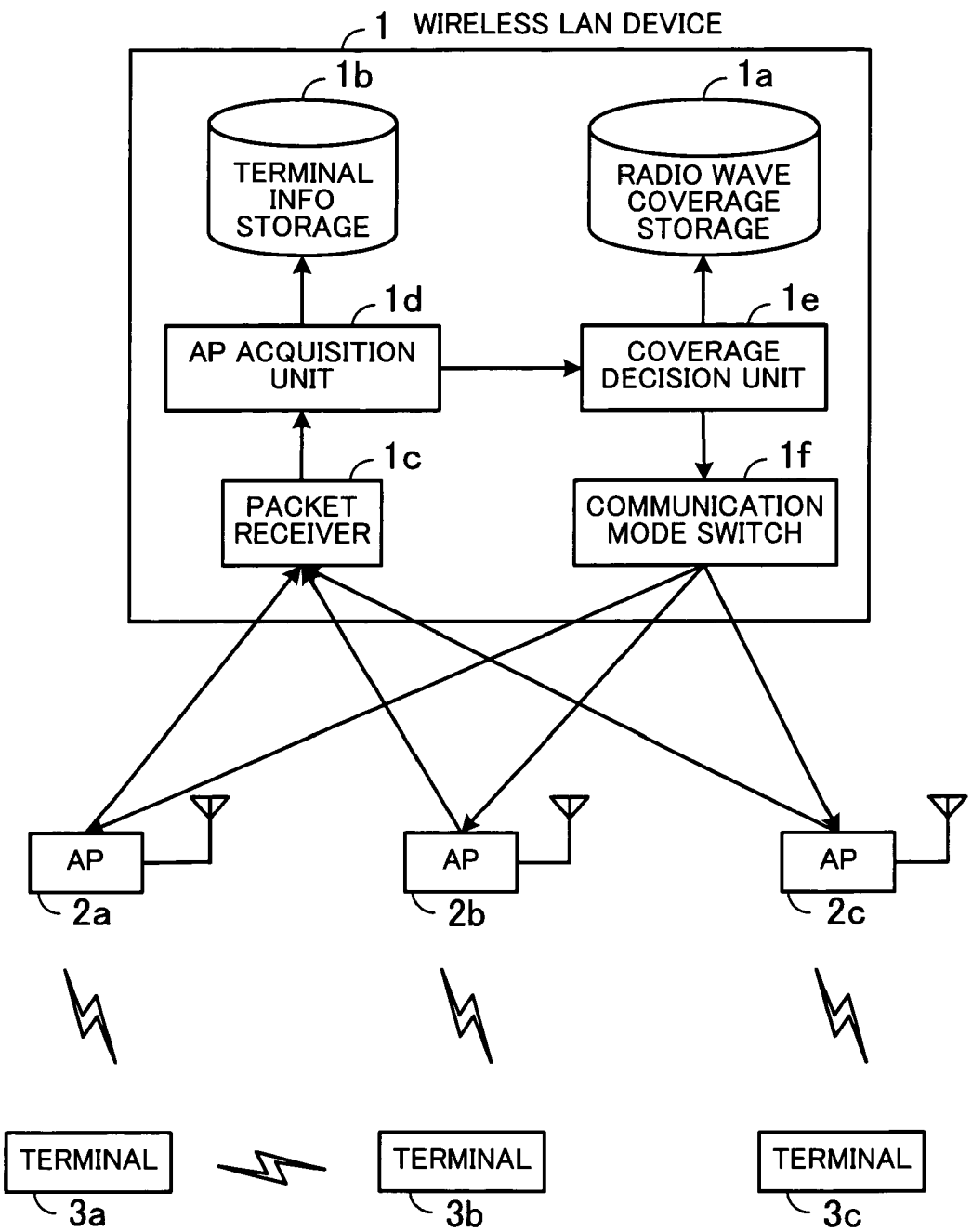
FIG. 1 schematically shows a wireless LAN device.

FIG. 1 schematically shows a wireless LAN device. In the figure, the wireless LAN device 1 is connected by wire with access points (APs) 2a to 2c. The access points 2a to 2c are respectively associated with terminals 3a to 3c. The access points 2a to 2c communicate with the respective terminals 3a to 3c by wireless.

In the case where the terminals 3a to 3c communicate in infrastructure mode, the wireless LAN device 1 relays packets to be transmitted to or received from the terminals 3a to 3c. For example, where the terminal 3a communicates with the terminal 3c in infrastructure mode, the terminal 3a transmits packets to the wireless LAN device 1 via the access point 2a. The wireless LAN device 1 transmits the received packets to the terminal 3c via the access point 2c.

The wireless LAN device 1 includes a radio wave coverage storage 1a, a terminal information storage 1b, a packet receiver 1c, an access point acquisition unit 1d, a radio wave coverage decision unit 1e, and a communication mode switch 1f.

The radio wave coverage storage 1a stores radio wave coverage information about the coverage of radio waves amongst the access points 2a to 2c. For example, the radio wave coverage storage 1a stores radio wave coverage information indicating that the access points 2a and 2b are within each other's coverage of radio waves.

The terminal information storage 1b stores terminal information about the terminals 3a to 3b associated with the respective access points 2a to 2c. For example, the terminal information storage 1b stores terminal information indicating that the terminals 3a, 3b and 3c are associated respectively with the access points 2a, 2b and 2c.

The packet receiver 1c receives, via the access points 2a to 2c, packets transmitted from the terminals 3a to 3c in infrastructure mode.

Using terminal information about originating and destination terminals contained in the packet received by the packet receiver 1c, the access point acquisition unit 1d looks up the terminal information storage 1b to identify the access point with which the originating terminal is associated and the access point with which the destination terminal is associated.

Let us suppose, for example, that the terminal 3a transmits a packet to the terminal 3b in infrastructure mode. In this case, the packet contains terminal information about the terminal 3a as the originating terminal, as well as terminal information about the terminal 3b as the destination terminal. Based on the terminal information about the originating terminal 3a and the destination terminal 3b contained in the packet, the access point acquisition unit 1d looks up the terminal information storage 1b and identifies the access point 2a with which the terminal 3a is associated and the access point 2b with which the terminal 3b is associated.

The radio wave coverage decision unit 1e looks up the radio wave coverage storage 1a to determine whether or not the access points with which the originating and destination terminals are associated, respectively, are within each other's coverage of radio waves.

Let it be assumed, for example, that the radio wave coverage storage 1a stores radio wave coverage information indicating that the access points 2a and 2b are within each other's coverage of radio waves. In this case, the radio wave coverage decision unit 1e judges that the access points 2a and 2b with which the terminals 3a and 3b are associated, respectively, are within each other's coverage of radio waves.

In accordance with the result of the determination by the radio wave coverage decision unit 1e, the communication mode switch 1f switches the mode of communication between the originating and destination terminals to ad-hoc mode.

In the above instance, the radio wave coverage decision unit 1e judges that the access points 2a and 2b are within each other's coverage of radio waves, and therefore, the communication mode switch 1f switches the mode of communication between the originating and destination terminals 3a and 3b to ad-hoc mode.

In the case where the radio wave coverage information indicating that the access points 2a and 2b are within each other's coverage of radio waves is not stored in the radio wave coverage storage 1a, the radio wave coverage decision unit 1e judges that the access points 2a and 2b, with which the terminals 3a and 3b are respectively associated, are not within each other's coverage of radio waves. In this case, the communication mode switch 1f does not switch the mode of communication between the originating and destination terminals 3a and 3b to ad-hoc mode, so that the terminals 3a and 3b continue to communicate with each other in infrastructure mode.

In this manner, with respect to terminals communicating with each other in infrastructure mode, the wireless LAN device 1 determines whether or not the access points with which the respective terminals are associated are within each other's coverage of radio waves. If the access points with which the respective terminals are associated are within each other's coverage of radio waves, the mode of communication between the terminals is switched from infrastructure mode to ad-hoc mode.

On the other hand, if the access points are not within each other's coverage of radio waves, the mode of communication between the terminals associated with the respective access points is not switched to ad-hoc mode, whereby failure in the switching from infrastructure mode to ad-hoc mode can be lessened.

It is possible that, although the access points are within each other's coverage of radio waves, the terminals associated therewith are not within each other's coverage of radio waves. Nevertheless, if at least the access points are within each other's coverage of radio waves, it is judged that the terminals are also within each other's coverage of radio waves, and this serves to lessen failure in the switching from infrastructure mode to ad-hoc mode.

A first embodiment of the present invention will be now described in detail with reference to the drawings wherein the invention is applied to a wireless LAN switch as the wireless LAN device.

Figure 2:
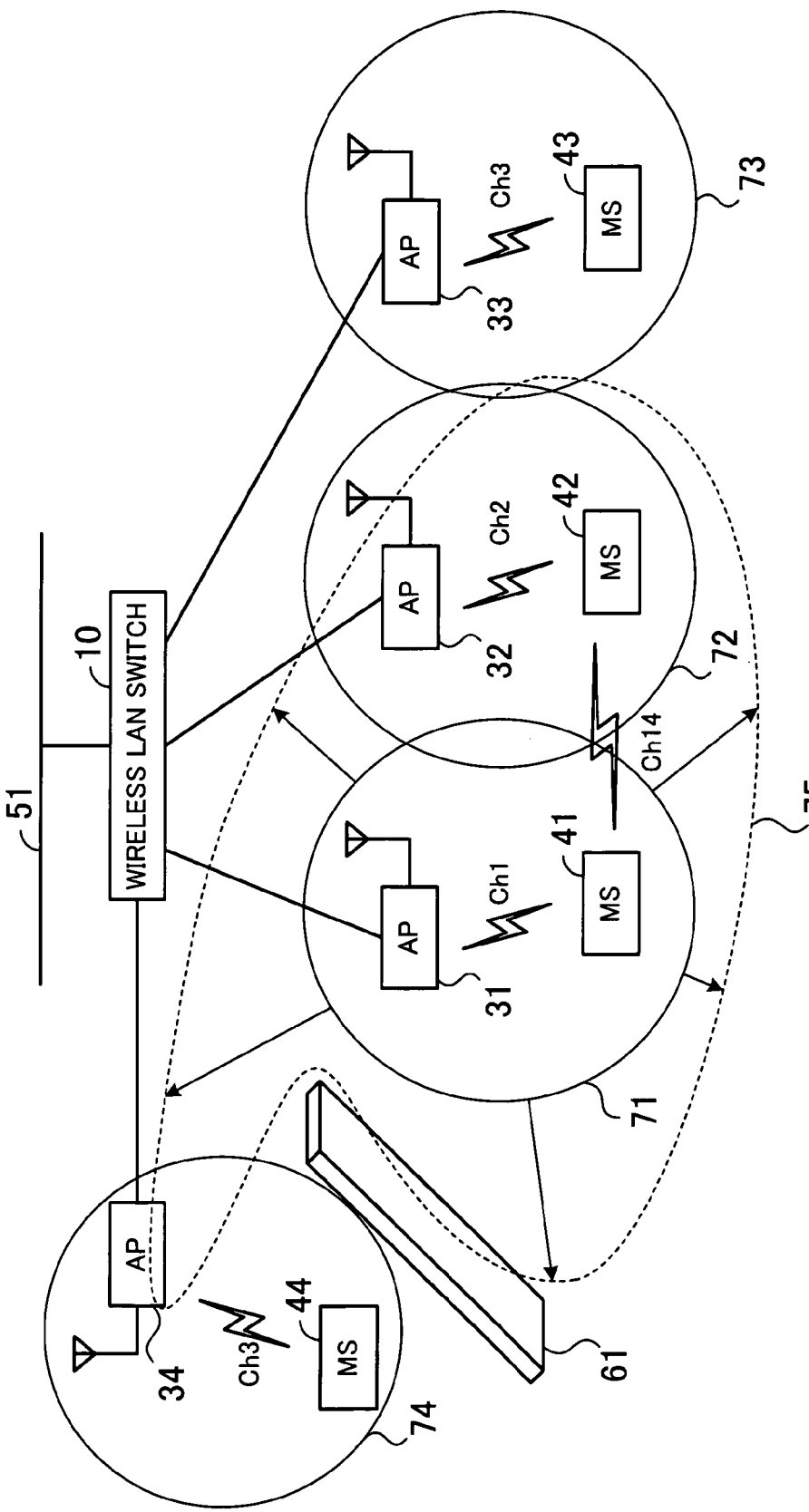
FIG. 2 shows an exemplary system configuration comprising a wireless LAN switch of a first embodiment, access points, and mobile stations.

FIG. 2 shows an exemplary system configuration comprising the wireless LAN switch of the first embodiment, access points (APs), and mobile stations (MSs). As illustrated, the wireless LAN switch 10 is connected, for example, to a wired Ethernet backbone network 51. Also, the wireless LAN switch 10 is connected by wire with access points 31 to 34.

Let us suppose, for example, that the access point 31 and a mobile station 41 are communicating in infrastructure mode by using a channel Ch1, that the access point 32 and a mobile station 42 are communicating in infrastructure mode by using a channel Ch2, that the access point 33 and a mobile station 43 are communicating in infrastructure mode by using a channel Ch3, and that the access point 34 and a mobile station 44 are communicating in infrastructure mode by using a channel Ch4. Reference numeral 61 denotes an obstacle blocking the propagation of radio waves, 71 to 74 denote radio wave coverage areas of the respective access points 31 to 34 during operation, and 75 denotes a maximum radio wave coverage area (maximum transmit power) of the access point 31.

The wireless LAN switch 10 detects communication in infrastructure mode between the mobile stations 41 to 44, based on packets received from the access points 31 to 34, and determines whether to switch the mode of communication from infrastructure mode to ad-hoc mode. If it is judged that the communication mode should be switched, the wireless LAN switch 10 transmits an ad-hoc mode switching instruction to those of the mobile stations 41 to 44 with respect to which communication in infrastructure mode has been detected. On receiving the switching instruction, the corresponding ones of the mobile stations 41 to 44 switch the communication mode to ad-hoc mode in accordance with the instruction. For example, the mobile stations 41 and 42 start to communicate with each other in ad-hoc mode by using a channel Ch14 in accordance with the switching instruction from the wireless LAN switch 10.

Thus, the wireless LAN switch 10 determines whether or not the mode of communication between the mobile stations 41 to 44 should be switched from infrastructure mode to ad-hoc mode and thereby lessens failure in the switching of the mobile stations 41 to 44 from infrastructure mode to ad-hoc mode.

An ad-hoc access point list held by the wireless LAN switch 10 in FIG. 2 will be now described.

FIG. 3 exemplifies the data structure of the ad-hoc access point list. As illustrated, the ad-hoc access point list 81 has columns labeled "AP" and "Ad-hoc Access Point". In the column "AP" are registered the identifiers of the individual access points associated with the wireless LAN switch 10, and in the column "Ad-hoc Access Point" are registered the identifiers of access points which are within the radio wave coverage areas of the respective access points specified in the column "AP". The ad-hoc access point list 81 is stored in a storage device such as RAM (Random Access Memory) or HDD (Hard Disk Drive).

The ad-hoc access point list 81 shows information about access points which are within each other's coverage of radio waves, among the access points 31 to 34. The wireless LAN switch 10 looks up the ad-hoc access point list 81 to acquire the coverage of radio waves amongst the access points.

Let it be assumed here that the identifiers of the access points 31 to 34 are AP1 to AP4, respectively. The ad-hoc access point list 81 is looked up to find, for example, access points which are within the radio wave coverage of AP1, whereupon AP2 and AP4 are found as a result. In the following description, it is assumed that the identifiers of the access points 31 to 34 are AP1 to AP4, respectively, and that the identifiers of the mobile stations 41 to 44 are MS1 to MS4, respectively.

The wireless LAN switch 10 performs auto-calibration in advance and, in accordance with the results of auto-calibration, generates the ad-hoc access point list 81. For example, the auto-calibration is performed "in advance" at the time when the wireless LAN switch 10 and the access points 31 to 34 are introduced for the first time to an office or the like, when an access point has been added or removed, or when obstacles to propagation of radio waves have been moved to different positions due to change of the layout of the office or the like.

The wireless LAN switch 10 generates the ad-hoc access point list 81 in the manner described below. First, the wireless LAN switch 10 causes the access point 31 to gradually increase its radio wave transmission power from the minimum transmit power to the maximum transmit power, as indicated by the coverage areas 71 and 75 shown in FIG. 2. The wireless LAN switch 10 then receives a reception notification from those of the access points 32 to 34 which have received the radio waves from the access point 31 (auto-calibration). In the example of FIG. 2, the radio waves of the access point 31 reach the access points 32 and 34 but do not reach the access point 33. Consequently, the wireless LAN switch 10 receives a reception notification from the access points 32 and 34.

Subsequently, the wireless LAN switch 10 performs auto-calibration with respect to the other access points 32 to 34 in the same manner as performed with respect to the access point 31, and generates the ad-hoc access point list 81 as shown in FIG. 3.

Instead of changing the radio wave transmission power from the minimum transmit power up to the maximum transmit power, the transmit power may be varied from a certain value up to a certain value, for example, to generate the ad-hoc access point list 81. Namely, the ad-hoc access point list 81 may be generated based on the radio wave coverage information about access points which are within a certain coverage area of radio waves.

The auto-calibration also offers the function of setting channels for the access points 31 to 34, the function of adjusting the radio wave transmission powers of the access points 31 to 34, and the function of mapping the positions of the access points with respect to user's input map information (e.g., office floor diagram showing desks and partitions) and presenting the results to the user.

Also, as shown in FIG. 2, the coverage of radio waves during operation of the access point 31 differs from the maximum coverage attained when the access point 31 transmits radio waves with the maximum power, for the reasons stated below. The first reason is that the radio wave coverage areas of the access points should be narrowed from the point of view of load balancing so that a large number of mobile stations may not be connected to a single access point. The second reason is that, although the access points should basically be assigned respective different channels in order to restrain the interference of radio waves, it is often the case that the access points cannot be assigned respective different channels because of the arrangement of the access points. In such cases, an identical channel is assigned to different access points and the radio wave transmission powers of the individual access points are suitably adjusted to minimize the interference of radio waves.

An access point-mobile station association list held by the wireless LAN switch 10 will be now described.

FIG. 4 shows an exemplary data structure of the access point-mobile station association list. As illustrated, the access point-mobile station association list 82 has columns labeled "AP" and "Associated MS". In the column "AP" are registered the identifiers of the individual access points associated with the wireless LAN switch 10, and in the column "Associated MS" is stored information about the mobile stations associated with the respective access points specified in the column "AP". The access point-mobile station association list 82 is stored in a storage device such as RAM or HDD.

The access point-mobile station association list 82 shows information about the association of the mobile stations 41 to 44 with the access points 31 to 34. The wireless LAN switch 10 looks up the access point-mobile station association list 82 to identify the mobile station(s) associated with a certain access point.

To communicate in infrastructure mode, the access point and the mobile station first establish a connection and then actually transmit/receive user data. The operation of establishing a connection is called "associate" or "association". When a mobile station is newly associated, the access point transmits information about the new mobile station (e.g., MAC address of the mobile station) to the wireless LAN switch 10. On the other hand, when the mobile station is disconnected or disassociated from the access point, the access point notifies the wireless LAN switch 10 of the disassociation. The wireless LAN switch 10 collects these items of information to create the access point-mobile station association list 82 shown in FIG. 4. Since each access point sends information to the wireless LAN switch 10 at the time of association or disassociation, the wireless LAN switch 10 can be notified of the mobile stations associated with the respective access points in real time.

The following describes a message transmitted from the wireless LAN switch 10 to corresponding ones of the mobile stations 41 to 44 when the communication mode is switched from infrastructure mode to ad-hoc mode.

Figure 5:
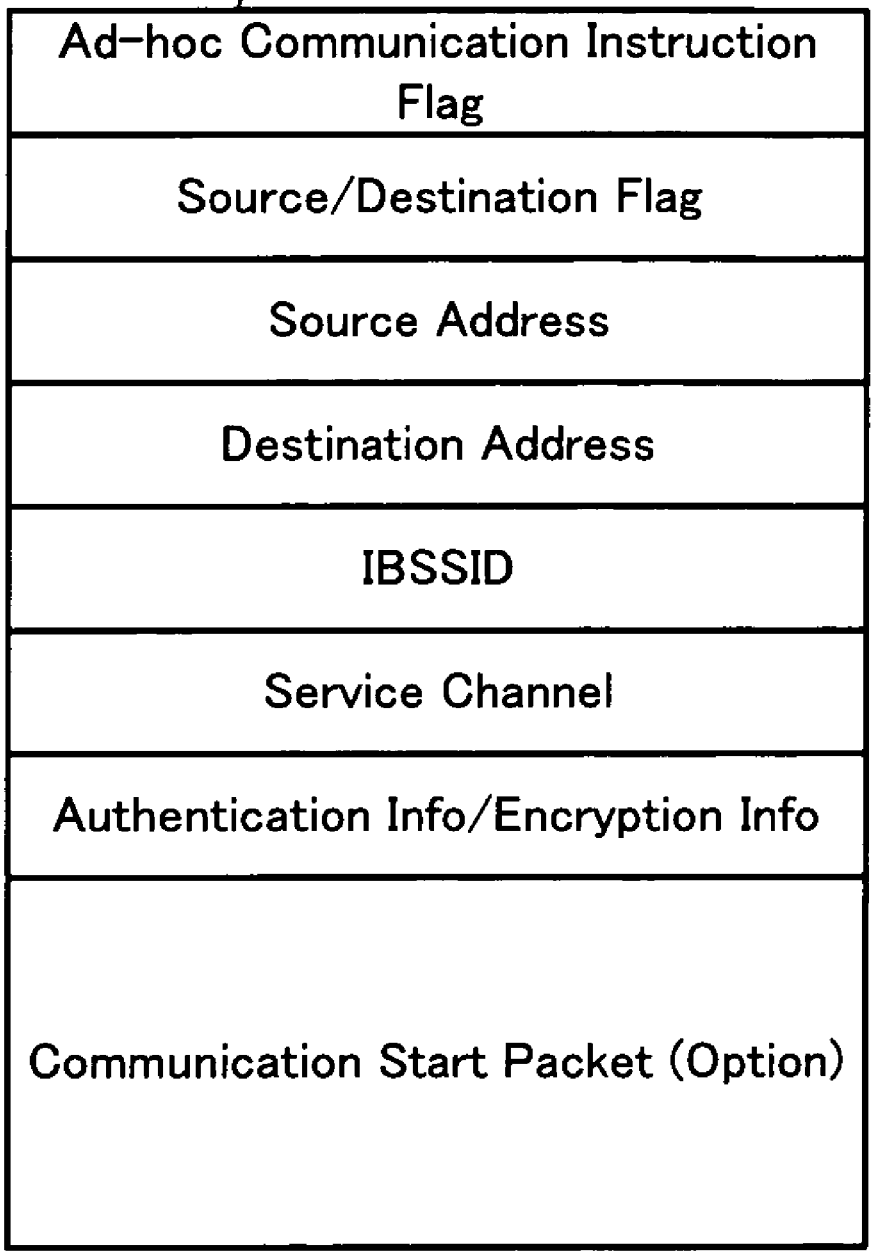
FIG. 5 shows the data format of a message transmitted at the time of switching communication mode to ad-hoc mode.

FIG. 5 shows the data format of an ad-hoc mode switching instruction message 83 which is transmitted when the communication mode is switched to ad-hoc mode. On detecting communication in infrastructure mode between mobile stations, the wireless LAN switch 10 generates the ad-hoc mode switching instruction message 83 and transmits the generated message to the mobile stations with respect to which the communication in infrastructure mode has been detected.

The ad-hoc mode switching instruction message 83 includes fields named "Ad-hoc Communication Instruction Flag", "Source/Destination Flag", "Source Address", "Destination Address", "IBSSID", "Service Channel", "Authentication Information/Encryption Information", and "Communication Start Packet".

In the field "Ad-hoc Communication Instruction Flag", a flag indicating that this message is an instruction to switch the communication mode to ad-hoc mode is stored. If the flag set in this field is "1", for example, the mobile stations 41 to 44 recognize that the received message is an instruction to switch the communication mode to ad-hoc mode.

In the field "Source/Destination Flag" is stored a flag indicating whether this message is destined for the originating mobile station or the destination mobile station. At first, a mobile station tries to communicate with another mobile station in infrastructure mode. On receiving the first packet from the mobile station which is trying to communicate in infrastructure mode, the wireless LAN switch 10 determines whether to switch the communication mode to ad-hoc mode, and if it is judged that the communication mode should be switched to ad-hoc mode, the wireless LAN switch transmits the ad-hoc mode switching instruction message 83 to each of the originating and destination mobile stations. At this time, the wireless LAN switch 10 sets different values for the flag in the field "Source/Destination Flag" so that the ad-hoc mode switching instruction message 83 transmitted to the originating mobile station may be distinguished from that transmitted to the destination mobile station.

For example, the wireless LAN switch 10 sets "1" in the field "Source/Destination Flag" of the ad-hoc mode switching instruction message 83 to be transmitted to the originating mobile station. On the other hand, the ad-hoc mode switching instruction message 83 with the value "0" set in the field "Source/Destination Flag" is transmitted to the destination mobile station.

In the field "Source Address" is stored the MAC address of the originating mobile station included in the first packet received by the wireless LAN switch 10. In the field "Destination Address" is stored the MAC address of the destination mobile station included in the first packet received by the wireless LAN switch 10.

In the field "IBSSID" is stored the identifier of an ad-hoc mode network used for the communication in ad-hoc mode to which the mobile stations are switched. The wireless LAN switch 10 manages the IBSSIDs so that the same IBSSID may not be assigned to different ad-hoc mode networks.

In the field "Service Channel", a channel used for ad-hoc mode is stored. The wireless LAN switch 10 selects a channel so as not to interfere with the communication in infrastructure mode.

In the field "Authentication Information/Encryption Information" is stored authentication information/encryption information used for the communication in ad-hoc mode to which the mobile stations are switched. The authentication information/encryption information includes, for example, information about encryption key, and is used for the communication in ad-hoc mode to which the mobile stations are switched.

In the field "Communication Start Packet", the first packet transmitted from the originating mobile station in infrastructure mode is stored intact. Namely, the first packet from the mobile station is encapsulated into the ad-hoc mode switching instruction message 83. Whether to use the field "Communication Start Packet" or not can be selected as an option.

In order for the packet which was transmitted first in infrastructure mode to reach the destination mobile station after the switching to ad-hoc mode, the originating mobile station needs to temporarily store the first packet in its buffer and then to retransmit the packet after the communication mode is switched to ad-hoc mode.

On the other hand, where the option to use the field "Communication Start Packet" is selected in the ad-hoc mode switching instruction message 83 to be transmitted to the originating mobile station, the wireless LAN switch 10 encapsulates the packet transmitted first in infrastructure mode into the field "Communication Start Packet" of the message 83 and transmits the message to the originating mobile station. This enables the originating mobile station to again transmit the packet, which is identical with that transmitted first in infrastructure mode, to the destination mobile station after the switching to ad-hoc mode without the need to use the buffer.

Also, where the option to use the field "Communication Start Packet" is selected in the ad-hoc mode switching instruction message 83 to be transmitted to the destination mobile station, the wireless LAN switch 10 encapsulates the packet transmitted first in infrastructure mode into the field "Communication Start Packet" of the message 83 and transmits the message to the destination mobile station. This makes it unnecessary for the originating mobile station to again transmit the packet, which is identical with that transmitted first in infrastructure mode, to the destination mobile station after the switching to ad-hoc mode.

Thus, the use of the field "Communication Start Packet" makes it unnecessary to provide each mobile station with a buffer, permitting the mobile stations to make good use of their storage device.

The function of the wireless LAN switch 10 shown in FIG. 2 will be now described. The function of the wireless LAN switch 10 is implemented by a CPU (Central Processing Unit) and storage devices such as ROM (Read Only Memory), RAM, and HDD. Alternatively, the function may be implemented by dedicated hardware.

Figure 6:
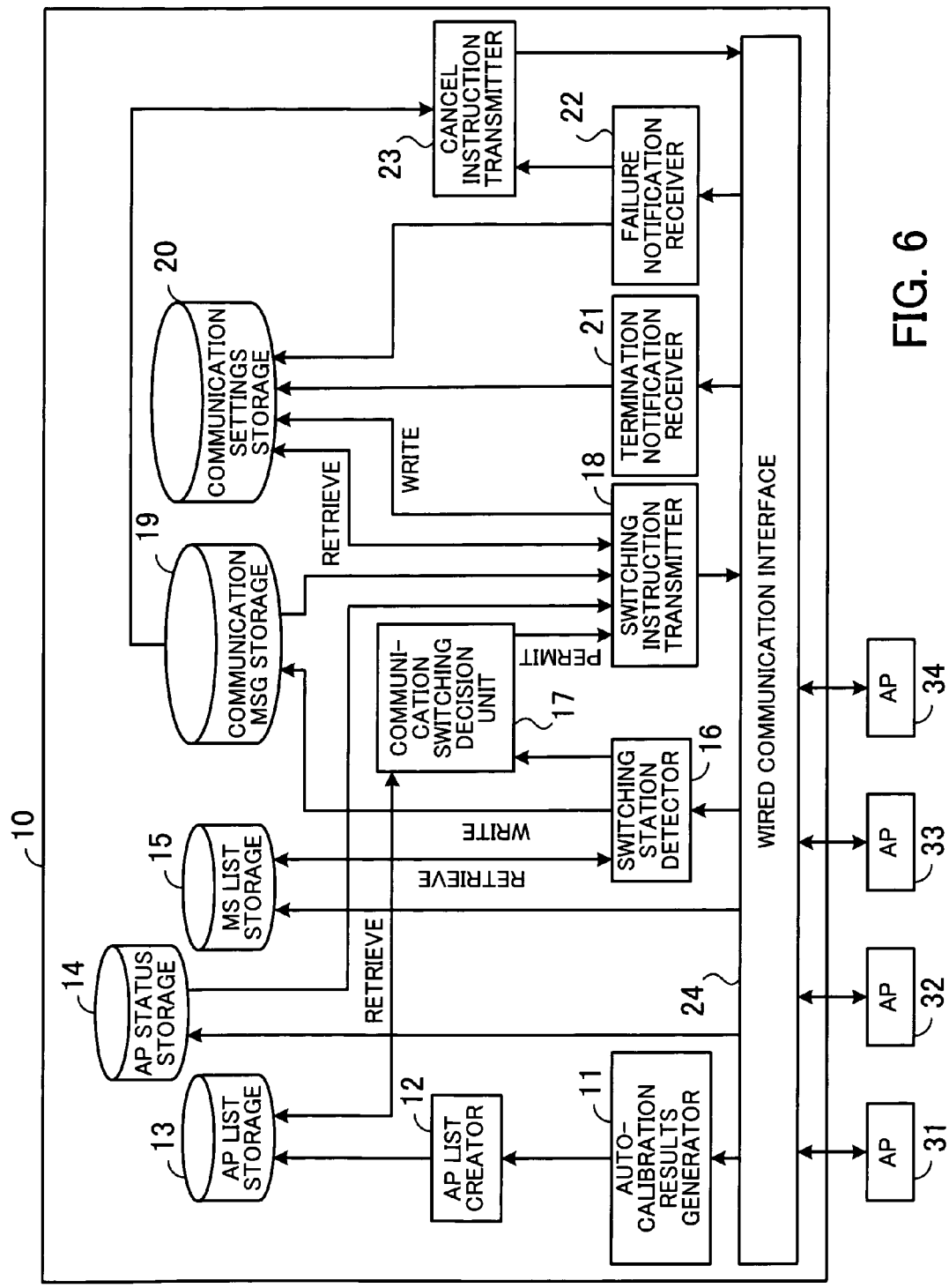
FIG. 6 is a functional block diagram of the wireless LAN switch.

FIG. 6 is a functional block diagram of the wireless LAN switch. As illustrated, the wireless LAN switch 10 comprises an auto-calibration results generator 11, an access point list creator 12, an access point list storage 13, an access point status storage 14, a mobile station list storage 15, a switching station detector 16, a communication switching decision unit 17, a switching instruction transmitter 18, a communication message (MSG) storage 19, a communication settings storage 20, a termination notification receiver 21, a failure notification receiver 22, a cancel instruction transmitter 23, and a wired communication interface 24. The access points 31 to 34 are also shown in the figure.

The auto-calibration results generator 11 communicates with the access points 31 to 34 to obtain auto-calibration results. Specifically, the auto-calibration results generator 11 causes a certain access point to gradually increase its radio wave transmission power from the minimum transmit power to the maximum transmit power. The auto-calibration results generator 11 then receives a reception notification from other access points which have received the radio waves from the transmitting access point, to obtain the results of auto-calibration (auto-calibration results) showing which access points have received the radio waves from the transmitting access point. The auto-calibration results generator 11 outputs the thus-obtained auto-calibration results to the access point list creator 12.

Based on the auto-calibration results received from the auto-calibration results generator 11, the access point list creator 12 generates the ad-hoc access point list 81, shown in FIG. 3, and stores the generated list in the access point list storage 13.

The access point status storage 14 holds information about the statuses of the access points 31 to 34. The statuses of the access points 31 to 34 are represented by, for example, the channels used by the respective access points 31 to 34. The statuses of the access points 31 to 34 can be acquired by using an ordinary processor known in the art, and therefore, the processor is omitted from FIG. 6.

The mobile station list storage 15 stores the access point-mobile station association list 82 shown in FIG. 4. The process for obtaining information about the mobile stations 41 to 44 (process for generating the access point-mobile station association list 82) can be performed by an ordinary processor known in the art, and therefore, the processor is omitted from FIG. 6.

The switching station detector 16 acquires, from the first packet transmitted from any of the mobile stations 41 to 44 in infrastructure mode, the MAC addresses of the originating and destination mobile stations. Then, using the acquired MAC addresses of the originating and destination mobile stations, the switching station detector 16 searches the access point-mobile station association list 82 in the mobile station list storage 15, to determine with which of the access points 31 to 34 the originating and destination mobile stations are respectively associated. The switching station detector 16 outputs the identifiers of the detected access points, among the access points 31 to 34, to the communication switching decision unit 17. Also, the switching station detector 16 stores, in the communication message storage 19, the first packets transmitted from the mobile stations 41 to 44 in infrastructure mode.

Using the access point identifiers received from the switching station detector 16, the communication switching decision unit 17 searches the ad-hoc access point list 81 in the access point list storage 13, to determine whether or not the communication mode should be switched from infrastructure mode to ad-hoc mode. Specifically, if the ad-hoc access point list 81 shows that the access points 31 to 34 detected by the switching station detector 16 are within each other's coverage of radio waves, it is judged that the communication mode should be switched to ad-hoc mode. When it is judged that the communication mode should be switched from infrastructure mode to ad-hoc mode, the communication switching decision unit 17 outputs, to the switching instruction transmitter 18, permission information indicating that the switching has been permitted.

On receiving the permission information from the communication switching decision unit 17, the switching instruction transmitter 18 generates the ad-hoc mode switching instruction messages 83, explained above with reference to FIG. 5, and transmits the generated messages to the originating and destination mobile stations, respectively. When generating the ad-hoc mode switching instruction messages 83, the switching instruction transmitter 18 sets the ad-hoc communication instruction flag, as well as the source/destination flag indicating whether the message is to be transmitted to the originating mobile station or the destination mobile station. Also, the MAC addresses of the originating and destination mobile stations are acquired from the first packet stored in the communication message storage 19 to generate the switching instruction messages 83. Further, the communication settings storage 20 is looked up to generate an IBSSID for the ad-hoc mode network so that the same IBSSID may not be assigned to different ad-hoc mode networks. In addition, the channels used by the access points 31 to 34 are read out from the access point status storage 14 to acquire an unused channel. Also, the authentication information/encryption information necessary for the communication in ad-hoc mode is generated and set in the switching instruction messages 83. Further, where the option to use the communication start packet is selected, the first packet is acquired from the communication message storage 19 and included in the field "Communication Start Packet", to generate the ad-hoc mode switching instruction messages 83.

When transmitting the ad-hoc mode switching instruction messages 83, the switching instruction transmitter 18 stores, in the communication settings storage 20, status information about the communication in ad-hoc mode (e.g., information about the mobile stations which are to communicate in ad-hoc mode) and settings information (IBSSID, service channel, etc.).

The option to use the field "Communication Start Packet" in the ad-hoc mode switching instruction message 83 can be selected, for example, from the mobile stations 41 to 44. Also, the wireless LAN switch 10 is provided with an input device for accepting the selection of the option, and thus the option can be directly selected by the user.

When termination of communication in ad-hoc mode is notified from any of the mobile stations 41 to 44 via the access points 31 to 34, the termination notification receiver 21 updates the status information and the settings information about the corresponding ad-hoc communication, stored in the communication settings storage 20, to a termination status.

Also, when failure of communication in ad-hoc mode is notified from any of the mobile stations 41 to 44 via the access points 31 to 34, the failure notification receiver 22 updates the status information and the settings information about the corresponding ad-hoc communication, stored in the communication settings storage 20, to a termination status. Further, the failure notification receiver 22 notifies the cancel instruction transmitter 23 of the failure of the ad-hoc communication.

On receiving the ad-hoc mode failure notification from the failure notification receiver 22, the cancel instruction transmitter 23 transmits an ad-hoc mode cancel instruction to the corresponding ones of the mobile stations 41 to 44 via the access points 31 to 34. Also, the cancel instruction transmitter 23 reads, from the communication message storage 19, the first packet with respect to which the ad-hoc communication has failed, and transmits the packet to the destination mobile station so that the mobile stations can resume communicating in infrastructure mode.

The wired communication interface 24 takes care of communications with the access points 31 to 34.

The function of the mobile station 41 shown in FIG. 2 will be now described. The function of the mobile station 41 is implemented by a CPU and storage devices such as ROM, RAM, and HDD. Alternatively, the function may be implemented by dedicated hardware.

Figure 7:
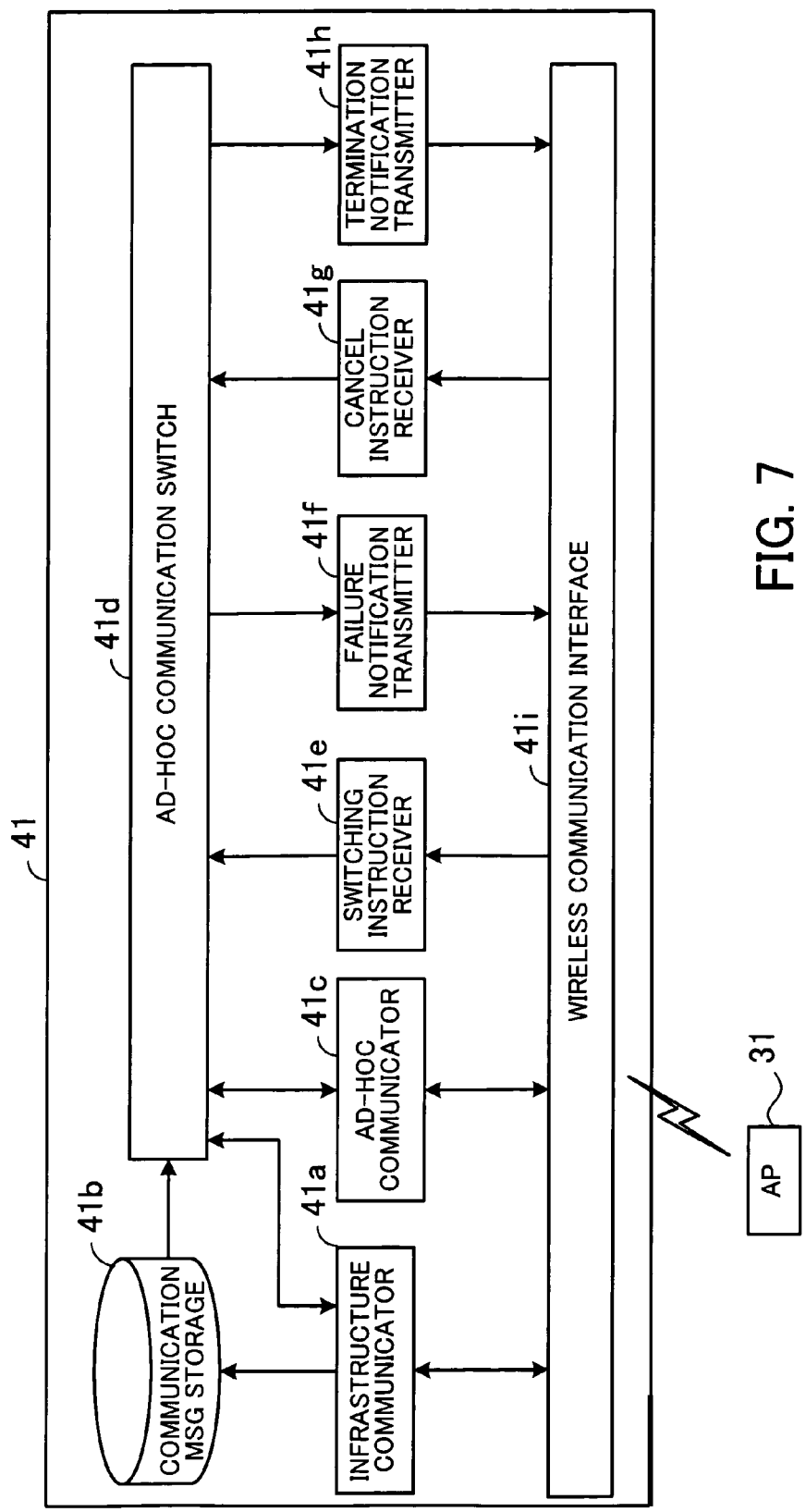
FIG. 7 is a functional block diagram of the mobile station.

FIG. 7 is a functional block diagram of the mobile station. As illustrated, the mobile station 41 comprises an infrastructure communicator 41a, a communication message (MSG) storage 41b, an ad-hoc communicator 41c, an ad-hoc communication switch 41d, a switching instruction receiver 41e, a failure notification transmitter 41f, a cancel instruction receiver 41g, a termination notification transmitter 41h, and a wireless communication interface 41i. The access point 31 is also shown in the figure.

The infrastructure communicator 41a communicates with the other mobile stations 42 to 44 in infrastructure mode via the access point 31. In the case where the option to use the field "Communication Start Packet" in the ad-hoc mode switching instruction message 83, explained above with reference to FIG. 5, is not selected, the mobile station 41 stores, in the communication message storage 41b, the first packet transmitted in infrastructure mode. This is because, after the switching to ad-hoc mode, the first packet needs to be again transmitted to the destination mobile station. Where the option is selected, the communication message storage 41b is unnecessary.

The ad-hoc communicator 41c communicates with the mobile stations 42 to 44 in ad-hoc mode. Also, in the case where the communication mode was switched to ad-hoc mode but the ad-hoc communication failed due to insufficient strength of radio waves, the ad-hoc communicator 41c notifies the ad-hoc communication switch 41d of the failure. Further, on termination of the communication in ad-hoc mode, the ad-hoc communicator 41c notifies the termination notification transmitter 41h of the termination via the ad-hoc communication switch 41d.

When the ad-hoc mode switching instruction is received from the switching instruction receiver 41e, the ad-hoc communication switch 41d instructs the infrastructure communicator 41a and the ad-hoc communicator 41c to switch the communication mode to ad-hoc mode. Also, when notified of the failure of ad-hoc communication from the ad-hoc communicator 41c, the ad-hoc communication switch 41d instructs the infrastructure communicator 41a and the ad-hoc communicator 41c to switch the communication mode to infrastructure mode and notifies the failure notification transmitter 41f of the failure of ad-hoc communication. Further, when the ad-hoc mode cancel instruction is received from the cancel instruction receiver 41g, the ad-hoc communication switch 41d instructs the infrastructure communicator 41a and the ad-hoc communicator 41c to switch the communication mode to infrastructure mode. Also, when notified of termination of the ad-hoc communication from the ad-hoc communicator 41c, the ad-hoc communication switch 41d instructs the infrastructure communicator 41a and the ad-hoc communicator 41c to switch the communication mode to infrastructure mode.

The switching instruction receiver 41e receives the ad-hoc mode switching instruction from the access point 31 and forwards the received instruction to the ad-hoc communication switch 41d.

The failure notification transmitter 41f is notified of the failure of the ad-hoc communication from the ad-hoc communication switch 41d and then notifies the wireless LAN switch 10 via the access point 31 that the ad-hoc communication has failed.

The cancel instruction receiver 41g receives the ad-hoc mode cancel instruction from the wireless LAN switch 10 via the access point 31 and sends the received instruction to the ad-hoc communication switch 41d.

The termination notification transmitter 41h is notified of the termination of the ad-hoc communication from the ad-hoc communicator 41c via the ad-hoc communication switch 41d and then notifies the wireless LAN switch 10 via the access point 31 that the ad-hoc communication has terminated.

Although the above description is directed to the mobile station 41, the other mobile stations 42 to 44 also have the same function as illustrated in FIG. 7.

Referring now to sequence diagrams, the operation of the wireless LAN switch 10, access points 31 to 34 and mobile stations 41 to 44, all appearing in FIG. 2, will be described.

Figure 8:
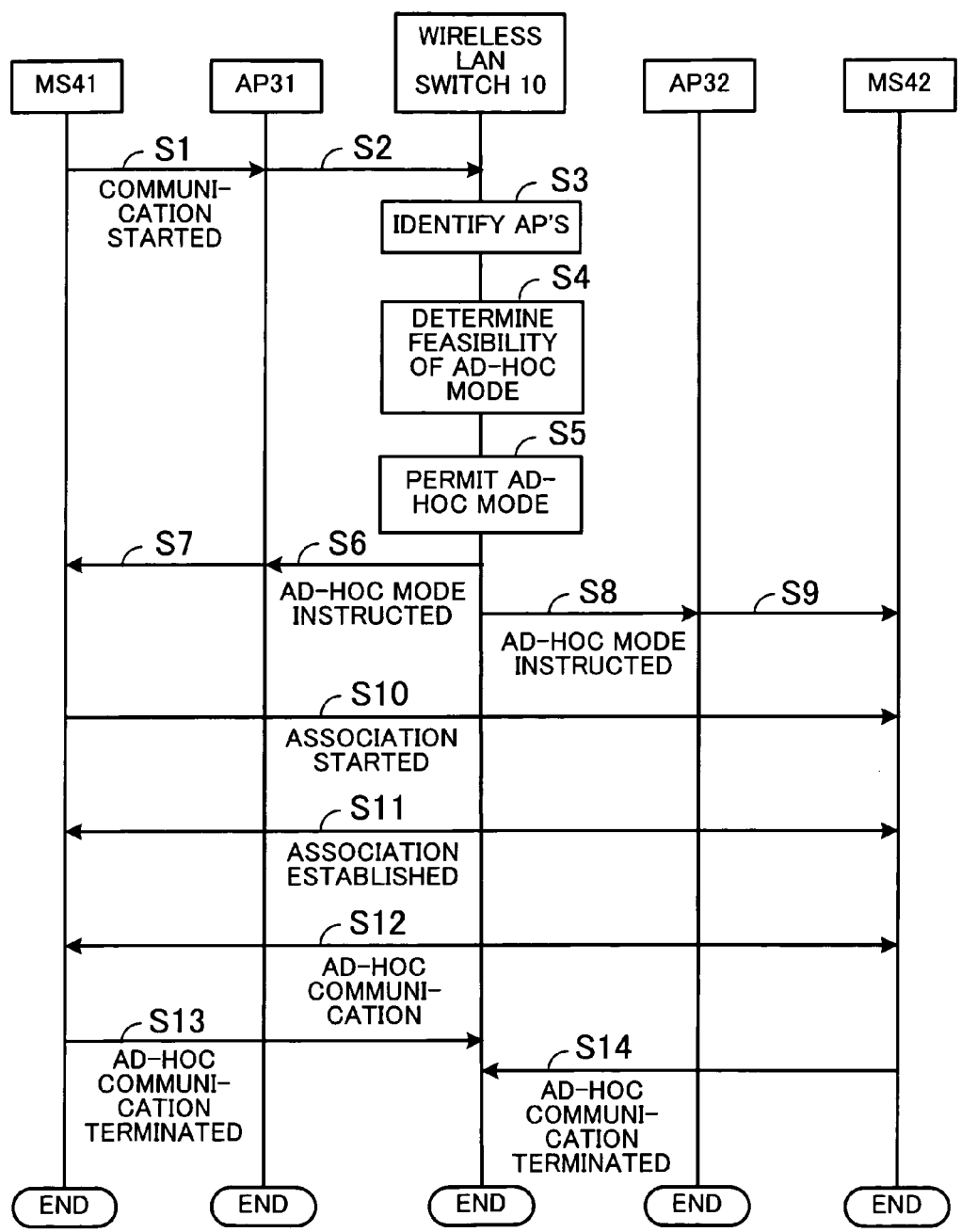
FIG. 8 is a sequence diagram illustrating the case where communication in ad-hoc mode is permitted.

FIG. 8 is a sequence diagram illustrating the case where communication in ad-hoc mode is permitted. In the following, it is assumed that the mobile station 41 associated with the wireless LAN switch 10 starts to communicate with the mobile station 42 in infrastructure mode. The mobile station 41 transmits a packet to the access point 31 (Step S1), which then transmits the packet received from the mobile station 41 to the wireless LAN switch 10 (Step S2).

On receiving the packet to be transmitted to the mobile station 42 from the mobile station 41, the wireless LAN switch 10 searches the access point-mobile station association list 82 shown in FIG. 4, by using the source address (MAC address of the mobile station 41) of the received packet, and recognizes that the mobile station 41 is associated with the access point 31 (Step S3). Also, using the destination address (MAC address of the mobile station 42) of the received packet, the wireless LAN switch 10 searches the access point-mobile station association list 82, shown in FIG. 4, and recognizes that the mobile station 42 is associated with the access point 32 (Step S3).

The wireless LAN switch 10 then looks up the ad-hoc access point list 81, shown in FIG. 3, to determine whether or not the access point 32, with which the mobile station 42 is associated, is a target of ad-hoc communication for the access point 31 with which the mobile station 41 is associated (Step S4). As seen from FIGS. 2 and 3, the access point 32 is a target of ad-hoc communication for the access point 31, and therefore, the wireless LAN switch 10 permits the switching of the communication mode to ad-hoc mode (Step S5).

Subsequently, the wireless LAN switch 10 transmits, via the access point 31, the ad-hoc mode switching instruction message 83 shown in FIG. 5, to instruct the mobile station 41 to communicate in ad-hoc mode (Steps S6, S7). Also, the wireless LAN switch 10 transmits, via the access point 32, the ad-hoc mode switching instruction message 83 shown in FIG. 5, to instruct the mobile station 42 to communicate in ad-hoc mode (Steps S8, S9).

The mobile station 41 starts association for ad-hoc communication (Step S10), and after the association between the mobile stations 41 and 42 is established (Step S11), communication is performed in ad-hoc mode (Step S12).

On termination of the ad-hoc communication, the mobile stations 41 and 42 each transmit a termination notification to the wireless LAN switch 10 (Steps S13, S14). The mobile stations 41 and 42 then resume communicating in infrastructure mode.

The following describes how the wireless LAN switch 10, the access points 31 to 34 and the mobile stations 41 to 44, all appearing in FIG. 2, operate in the case where communication in ad-hoc mode is not permitted.

Figure 9:
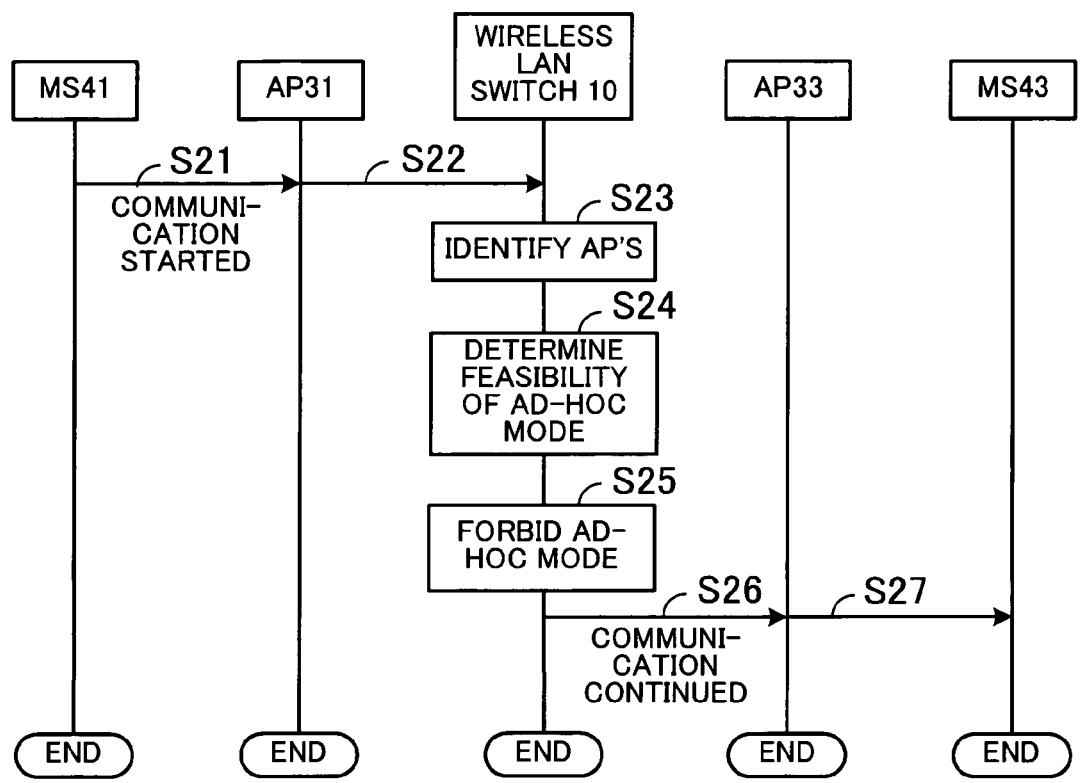
FIG. 9 is a sequence diagram illustrating the case where communication in ad-hoc mode is not permitted.

FIG. 9 is a sequence diagram illustrating the case where communication in ad-hoc mode is not permitted. In the following, it is assumed that the mobile station 41 associated with the wireless LAN switch 10 starts to communicate with the mobile station 43 in infrastructure mode. The mobile station 41 transmits a packet to the access point 31 (Step S21), which then transmits the packet received from the mobile station 41 to the wireless LAN switch 10 (Step S22).

On receiving the packet to be transmitted to the mobile station 43 from the mobile station 41, the wireless LAN switch 10 searches the access point-mobile station association list 82 shown in FIG. 4, by using the source address (MAC address of the mobile station 41) of the received packet, and recognizes that the mobile station 41 is associated with the access point 31 (Step S23). Also, using the destination address (MAC address of the mobile station 43) of the received packet, the wireless LAN switch 10 searches the access point-mobile station association list 82, shown in FIG. 4, and recognizes that the mobile station 43 is associated with the access point 33 (Step S23).

The wireless LAN switch 10 then looks up the ad-hoc access point list 81, shown in FIG. 3, to determine whether or not the access point 33, with which the mobile station 43 is associated, is a target of ad-hoc communication for the access point 31 with which the mobile station 41 is associated (Step S24). As seen from FIGS. 2 and 3, the access point 33 is not a target of ad-hoc communication for the access point 31, and therefore, the wireless LAN switch 10 forbids the communication mode to be switched to ad-hoc mode (Step S25).

Since the switching of the communication mode to ad-hoc mode is forbidden by the wireless LAN switch 10, communication is continued in infrastructure mode (Steps S26, S27).

The following describes how the wireless LAN switch 10, the access points 31 to 34 and the mobile stations 41 to 44, all appearing in FIG. 2, operate in the case where communication in ad-hoc mode fails. The wireless LAN switch 10 creates the ad-hoc access point list 81 through the auto-calibration and, based on the created list, determines whether to permit the communication mode to be switched to ad-hoc mode. This procedure serves to lessen failure in the switching to ad-hoc mode but does not assure that the ad-hoc communication succeeds without fail. For example, in the case where an obstacle blocking the propagation of radio waves exists between the mobile stations 41 and 44, as shown in FIG. 2, the radio waves from the access point 31 reach the access point 34 but the radio waves from the mobile station 41 may possibly fail to reach the mobile station 44. It is therefore necessary that the wireless LAN switch 10 be provided with a fail-safe function whereby the communication mode can be restored to infrastructure mode in case the ad-hoc communication fails.

Figure 10:
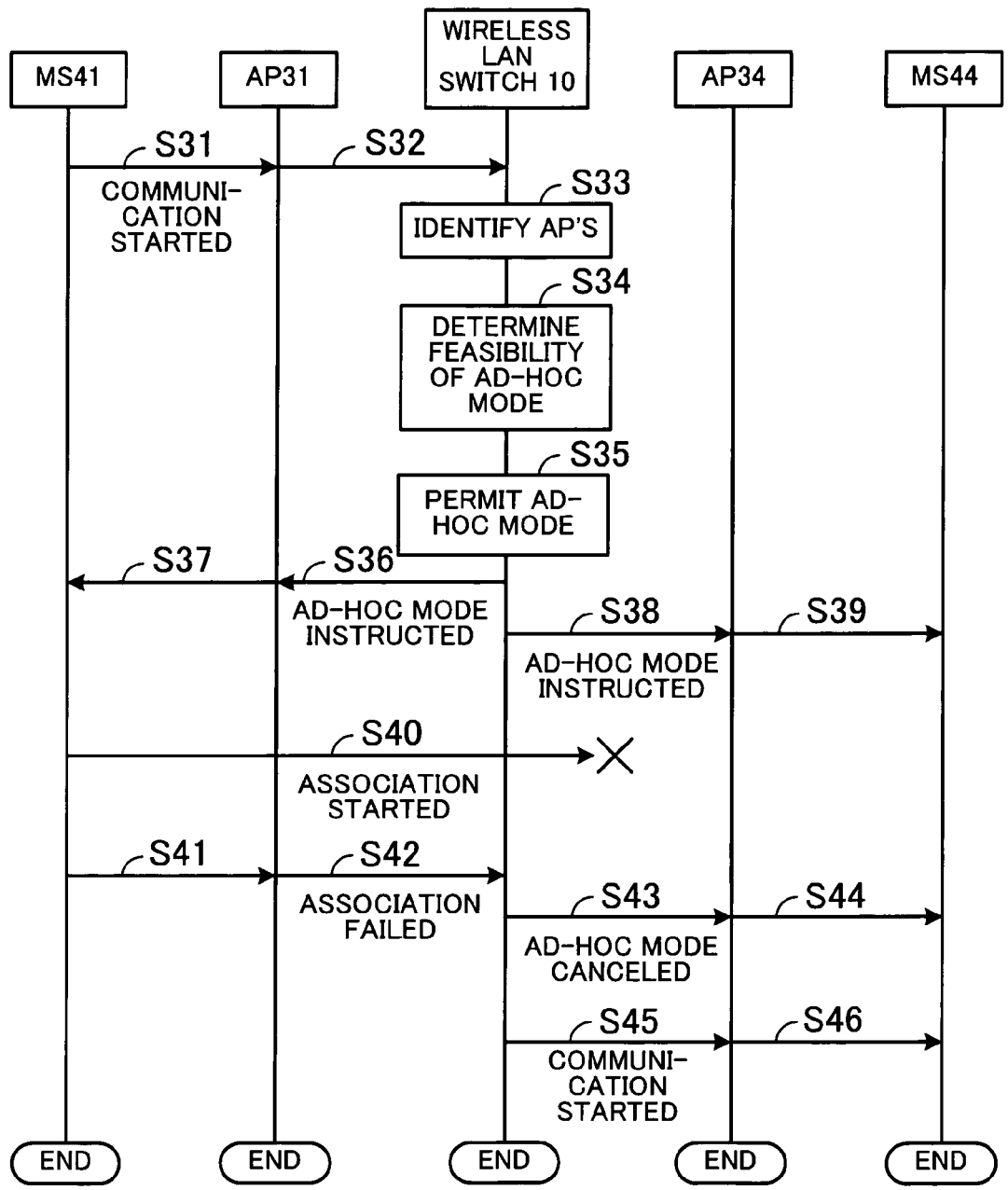
FIG. 10 is a sequence diagram illustrating the case where communication in ad-hoc mode failed.

FIG. 10 is a sequence diagram illustrating the case where communication in ad-hoc mode fails. In the following, it is assumed that the mobile station 41 associated with the wireless LAN switch 10 starts to communicate with the mobile station 44 in infrastructure mode. The mobile station 41 transmits a packet to the access point 31 (Step S31), which then transmits the packet received from the mobile station 41 to the wireless LAN switch 10 (Step S32).

On receiving the packet to be transmitted to the mobile station 44 from the mobile station 41, the wireless LAN switch 10 searches the access point-mobile station association list 82 shown in FIG. 4, by using the source address (MAC address of the mobile station 41) of the received packet, and recognizes that the mobile station 41 is associated with the access point 31 (Step S33). Also, using the destination address (MAC address of the mobile station 44) of the received packet, the wireless LAN switch 10 searches the access point-mobile station association list 82, shown in FIG. 4, and recognizes that the mobile station 44 is associated with the access point 34 (Step S33).

The wireless LAN switch 10 then looks up the ad-hoc access point list 81, shown in FIG. 3, to determine whether or not the access point 34, with which the mobile station 44 is associated, is a target of ad-hoc communication for the access point 31 with which the mobile station 41 is associated (Step S34). As seen from FIGS. 2 and 3, the access point 34 is a target of ad-hoc communication for the access point 31, and therefore, the wireless LAN switch 10 permits the switching of the communication mode to ad-hoc mode (Step S35).

Subsequently, the wireless LAN switch 10 transmits, via the access point 31, the ad-hoc mode switching instruction message 83 shown in FIG. 5, to instruct the mobile station 41 to communicate in ad-hoc mode (Steps S36, S37). Also, the wireless LAN switch 10 transmits, via the access point 34, the ad-hoc mode switching instruction message 83 shown in FIG. 5, to instruct the mobile station 44 to communicate in ad-hoc mode (Steps S38, S39).

The mobile station 41 starts association for ad-hoc communication (Step S40). However, the association fails because the radio waves from the mobile station 41 do not reach the mobile station 44 due to the obstacle 61 shown in FIG. 2. Accordingly, the mobile station 41 notifies the wireless LAN switch 10 via the access point 31 that the association has failed (Steps S41, S42).

The wireless LAN switch 10 transmits an ad-hoc mode cancel instruction to the mobile station 44 via the access point 34 (Steps S43, S44). After the cancellation of ad-hoc mode, the wireless LAN switch 10, which buffers the first packet to be transmitted to the mobile station 44 from the mobile station 41, transmits the first packet to the mobile station 44 (Steps S45, S46).

In this manner, the wireless LAN switch 10 determines whether or not the access points, with which mobile stations communicating in infrastructure mode are respectively associated, are within each other's coverage of radio waves and, if the access points are within each other's coverage of radio waves, switches the mode of communication between the mobile stations to ad-hoc mode.

If the access points are not within each other's coverage of radio waves, the communication between the mobile stations associated with the respective access points is not switched to ad-hoc mode, whereby failure in the switching from infrastructure mode to ad-hoc mode can be lessened.

A second embodiment of the present invention will be now described in detail with reference to the drawings.

In the second embodiment, information about mobile stations that failed in ad-hoc communication is stored in an additionally provided communication failure list storage, and the mode of communication between such mobile stations is thereafter prevented from switching to ad-hoc mode. Thus, in operational environments where mobile stations are not frequently moved, failure in the switching to ad-hoc mode can be more effectively lessened.

Such operational environments where mobile stations are not frequently moved are conceivably created in offices, for example. Usually, employees work at their own desks by using notebook computers (mobile stations), and only when a meeting is held, the employees bring their notebook computers into a conference room. Namely, a mobile station is moved from the coverage of one access point to that of another, and once associated with a certain access point, the mobile station is not frequently moved within the coverage of the access point until it is associated with another access point.

Figure 11:
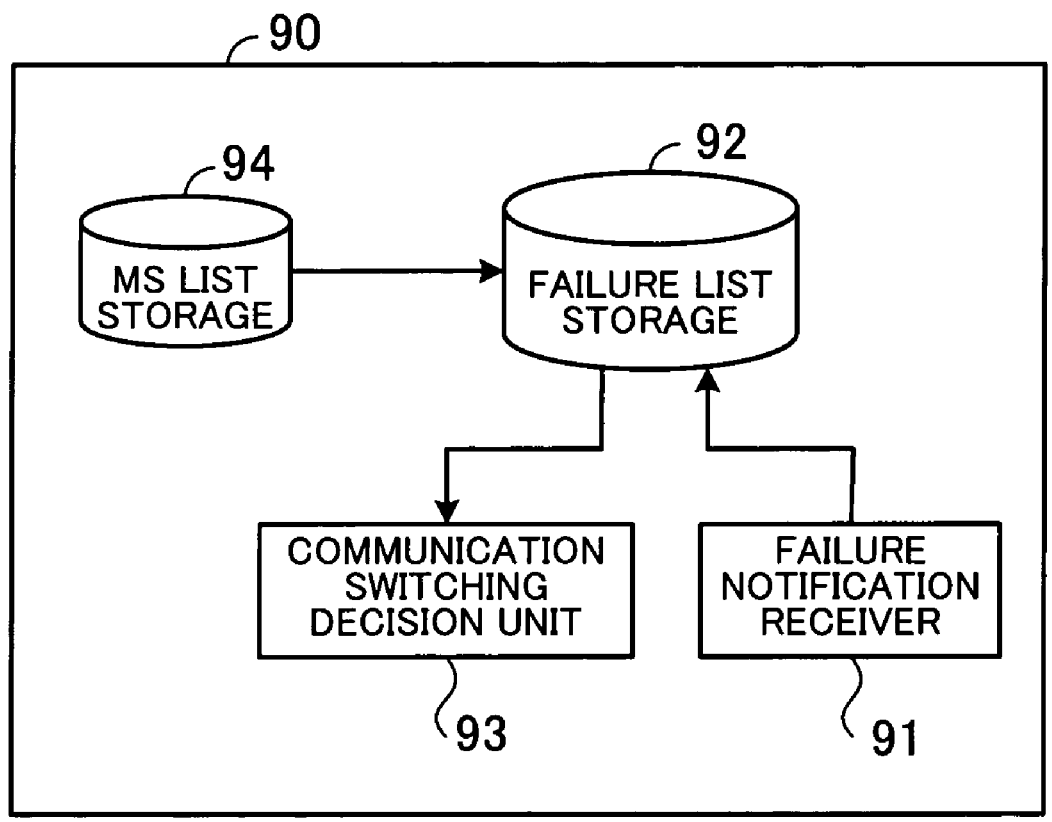
FIG. 11 is a functional block diagram of a wireless LAN switch according to a second embodiment.

FIG. 11 is a functional block diagram illustrating part of the function of a wireless LAN switch 90 according to the second embodiment. The wireless LAN switch 90 includes a failure notification receiver 91, a communication failure list storage 92, a communication switching decision unit 93, and a mobile station list storage 94. The other functional elements of the wireless LAN switch are identical with those shown in FIG. 6 and, therefore, are omitted from FIG. 11.

When the ad-hoc mode failure notification is received from any of the mobile stations 41 to 44 via the access points 31 to 34, the failure notification receiver 91 stores, in the communication failure list storage 92, the combination of the mobile stations which failed in ad-hoc communication.

Figure 12:
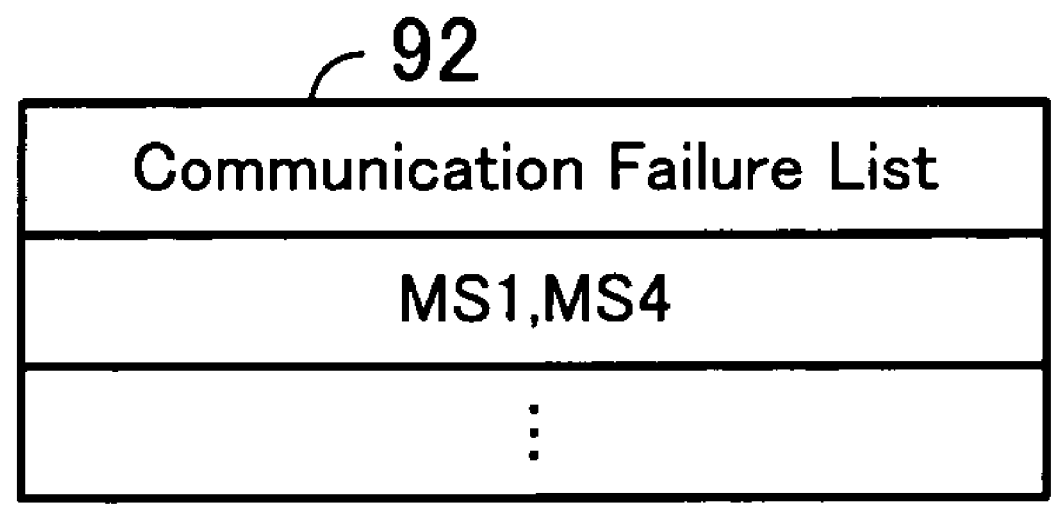

An exemplary data structure of the communication failure list storage 92 will be described with reference to FIG. 12. As illustrated, the communication failure list storage 92 stores information about mobile station pairs which have failed in ad-hoc communication. The mobile stations 41 and 44 are unable to communicate with each other in ad-hoc mode because of the obstacle 61, as shown in FIG. 2, and therefore, information about this mobile station pair is stored in the communication failure list storage 92.

Referring again to FIG. 11, when a determination is made as to whether or not the mode of communication between mobile stations should be switched from infrastructure mode to ad-hoc mode, the communication switching decision unit 93 looks up the communication failure list storage 92 to determine whether or not the mobile station pair in question has failed in ad-hoc communication in the past. If the mobile station pair in question has failed in ad-hoc communication in the past, the communication switching decision unit 93 forbids the switching of the communication mode to ad-hoc mode.

In cases where the relation between the access points and the mobile stations associated therewith has changed, the mobile station list storage 94 notifies the communication failure list storage 92 of the change of mobile stations to cause same to update the information stored therein.

Thus, information about mobile stations that failed in ad-hoc communication is stored in the communication failure list storage 92, and the mode of communication of such mobile stations is thereafter prevented from switching to ad-hoc mode. Consequently, in operational environments where mobile stations are not frequently moved, failure in the switching to ad-hoc mode can be more effectively lessened.

The above process works satisfactorily in environments where mobile stations are rarely moved within the coverage of the same access point; where mobile stations are moved from time to time, the information held by the communication failure list storage 92 is deleted at regular intervals of time. In cases where mobile stations are moved from time to time, it is possible that mobile stations which once failed in ad-hoc communication will thereafter become capable of successfully communicating with each other in ad-hoc mode. If, in such cases, the stored information is left unchanged, the chance of switching the communication mode to ad-hoc mode possibly lowers, though the switching failure can be lessened. Taking such situations into account, the communication failure list storage 92 may be adapted to store, besides the information about mobile stations that failed in the switching to ad-hoc mode, time information indicative of the time at which the information about the mobile stations was stored.

FIG. 13 shows an exemplary data structure of such a communication failure list storage. As illustrated, the communication failure list storage 92a stores time information in addition to information about mobile station pairs that failed in ad-hoc communication.

The failure notification receiver 91 stores, in the communication failure list storage 92a, information about the pair of mobile stations that failed in ad-hoc communication, as well as time information indicative of the time at which the information about the mobile station pair was stored.

After a lapse of a predetermined period from the stored time, the communication failure list storage 92a deletes the corresponding information about the failed mobile station pair therefrom.

This makes it possible to further lessen failure in the switching to ad-hoc mode and also to avoid reduction in the chance of switching the communication mode to ad-hoc mode.

The timing for deleting the information in the communication failure list storage 92a can be set by the administrator in accordance with the conditions of system operation.

A third embodiment of the present invention will be now described in detail with reference to the drawings.

In the third embodiment, information about mobile stations which are not within each other's coverage of radio waves, among the mobile stations associated with an identical access point, is generated based on RTS/CTS frames which are exchanged during communication in infrastructure mode, and is stored in an additionally provided non-coverage storage. With respect to the mobile stations registered in the non-coverage storage, the first packet transmitted therefrom is not stored in the communication message storage 19, thereby saving the capacity of the communication message storage 19.

Figure 14:
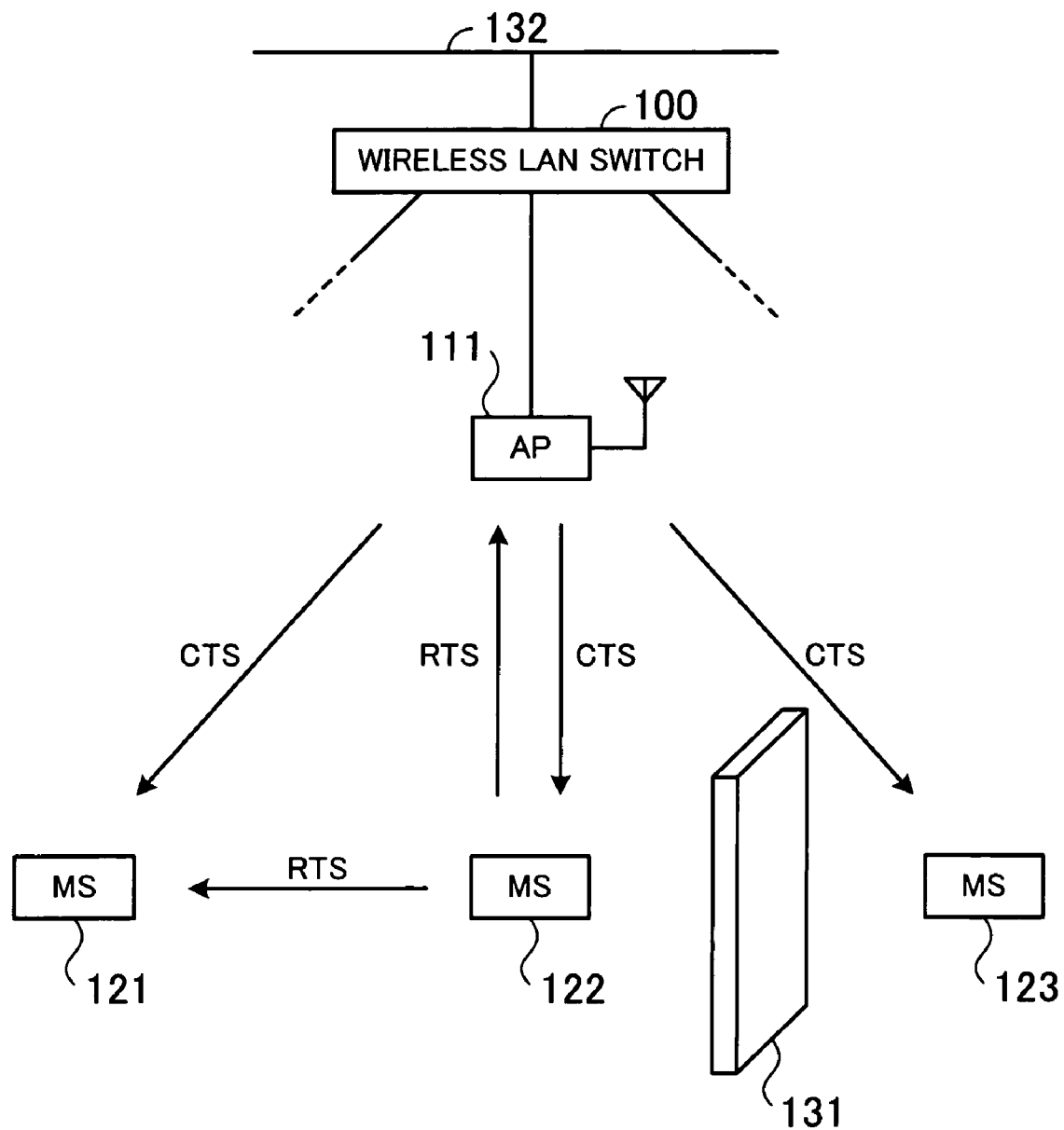
FIG. 14 shows an exemplary system configuration comprising a wireless LAN switch of a third embodiment, access points, and mobile stations.

FIG. 14 shows an exemplary system configuration comprising a wireless LAN switch of the third embodiment, access points, and mobile stations. As illustrated, the wireless LAN switch 100 is connected, for example, to a wired Ethernet backbone network 132. Also, the wireless LAN switch 100 is connected by wire with access points 111, . . . .

The access point 111 communicates with mobile stations 121 to 123 by wireless. An obstacle 131 exists between the mobile stations 122 and 123.

In order to cope with a hidden terminal problem, wireless LAN standards specify control frames called RTS (Request to Send) frame and CTS (Clear to Send) frame. The hidden terminal problem is a problem that, although mobile stations associated with an identical access point can communicate with the access point, radio waves of the mobile stations (e.g., in FIG. 14, the mobile stations 122 and 123) do not reach each other for some reason such as due to the obstacle 131.

To solve the problem, before actually transmitting data to the access point 111, the mobile station 122, for example, first transmits an RTS frame. The RTS frame includes an estimated duration for which the wireless channel is to be used. On receiving the RTS frame, the access point 111 transmits a CTS frame indicating the estimated duration included in the received RTS frame to each of the mobile stations 121 to 123 associated therewith. Consequently, the mobile station 123 can be notified that the mobile station 122 will be using the wireless channel, though it is unable to receive the radio waves from the mobile station 122 because of the obstacle 131. During the specified duration, the mobile station 123 refrains from using the wireless channel, whereby collision of data on the wireless channel can be avoided.

The mobile station 121 can receive the RTS frame transmitted from the mobile station 122, but the mobile station 123, which is a hidden terminal, cannot receive the RTS frame. Thus, the mobile station 123 receives the CTS frame but not the RTS frame, and in this case, the mobile station 123 transmits, to the wireless LAN switch 100, a notification that the mobile station 123 is not within the radio wave coverage of the mobile station 122 (radio wave non-coverage), together with the MAC address of the mobile station 122 included in the CTS frame. The wireless LAN switch 100 stores the radio wave non-coverage notification, received from the mobile station 123, in the non-coverage storage, described later. With respect to the mobile stations registered in the non-coverage storage, the wireless LAN switch 100 prevents the communication message storage 19 from storing the first packet transmitted from such mobile stations in infrastructure mode, thereby saving the capacity of the communication message storage 19. The mobile station 123 transmits the radio wave non-coverage notification to the wireless LAN switch 100 when the wireless channel is available.

The function of the wireless LAN switch 100 will be now described.

Figure 15:
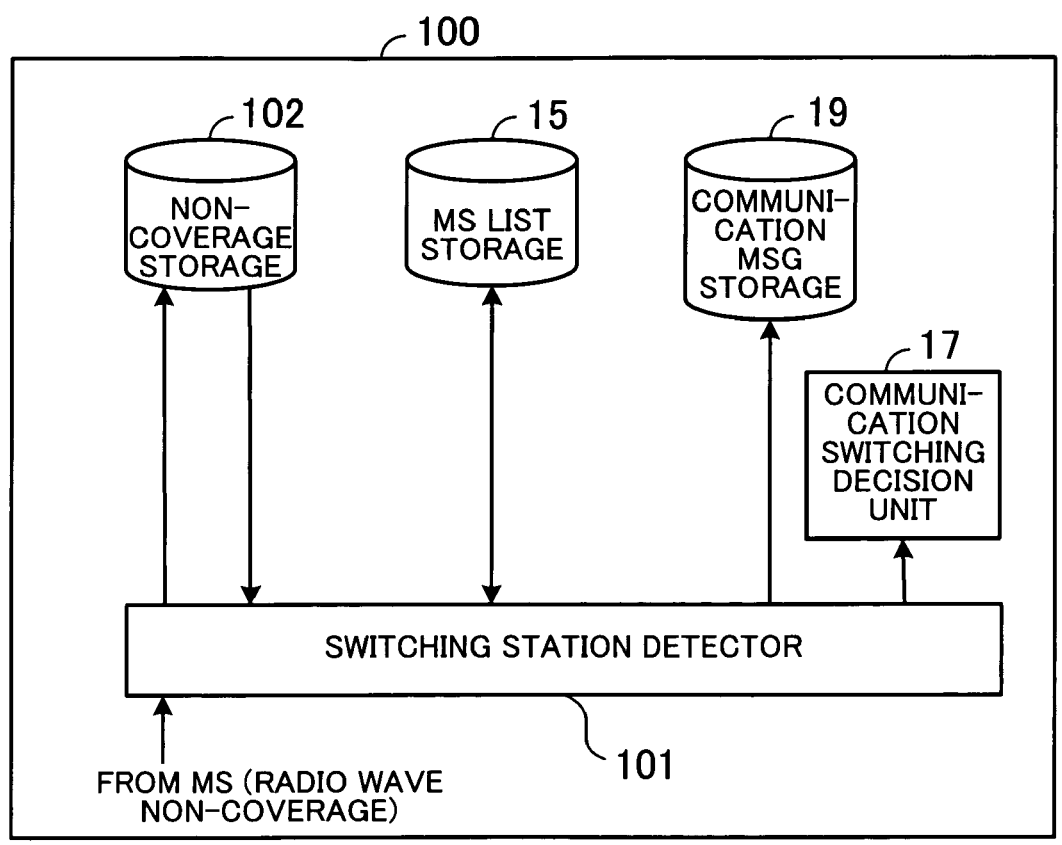
FIG. 15 is a functional block diagram of the wireless LAN switch of the third embodiment.

FIG. 15 is a functional block diagram illustrating part of the function of the wireless LAN switch 100. The wireless LAN switch 100 includes a switching station detector 101 and a non-coverage storage 102, as well as the mobile station list storage 15, the communication switching decision unit 17 and the communication message storage 19, shown in FIG. 6. The other functional elements of the wireless LAN switch are identical with those shown in FIG. 6 and, therefore, are omitted from the figure.

On receiving the radio wave non-coverage notification from any of the mobile stations, the switching station detector 101 stores the notification in the non-coverage storage 102. In the example shown in FIG. 14, the radio waves from the mobile station 122 do not reach the mobile station 123, and therefore, information about the mobile stations 122 and 123 is stored in the non-coverage storage 102.

The switching station detector 101 has the function explained below, besides the function explained above with reference to the first embodiment. If it is found as a result of the search of the mobile station list storage 15 that the target mobile stations are associated with an identical access point, the switching station detector determines whether or not the mobile stations are registered in the non-coverage storage 102. If the mobile stations are registered in the non-coverage storage 102, the switching station detector 101 does not store the first packet, transmitted from either of the mobile stations, in the communication message storage 19, nor it sends a detection notification to the communication switching decision unit 17.

In this manner, information about mobile stations which are not within each other's coverage of radio waves, among the mobile stations associated with an identical access point, is stored in the non-coverage storage 102. With respect to the mobile stations registered in the non-coverage storage 102, the first packet transmitted from such mobile stations is not stored in the communication message storage 19, thereby saving the capacity of the communication message storage 19.

A fourth embodiment of the present invention will be now described in detail with reference to the drawings.

In the fourth embodiment, the wireless LAN switch and each access point perform a MAC layer framing process (process of creating MAC layer frames) for the wireless LAN, and create a tunnel between the wireless LAN switch and the access point. The access point encapsulates the first packet (communication start packet) transmitted from a mobile station in infrastructure mode at the start of communication, and transmits the resultant packet to the wireless LAN switch. The wireless LAN switch encapsulates the mobile station-originated communication start packet, received from the access point, into the ad-hoc mode switching instruction message 83 while retaining the sequence number, and transmits the message back to the mobile station. Thus, even in the case where multiple communication start packets are transmitted from a mobile station, the communication start packets are returned from the wireless LAN switch with the sequence numbers left unchanged, so that the mobile station can easily retransmit the communication start packets after the communication mode is switched to ad-hoc mode.

Each access point may be adapted to encapsulate all packets to be transmitted to the wireless LAN switch, without making a distinction between the communication start packets and other packets.

Generally, at the start of communication, handshaking is conducted to establish a session between both parties of communication, and therefore, a situation where packets are continuously transmitted from one side does not arise. In some protocols, however, different communication sessions are used for control connection and data connection, and once the communication session is established by the control connection, data is continuously transmitted without conducting a handshake for the data connection.

In such cases, the wireless LAN switch may simply return the continuously received communication start packets to the corresponding mobile station. If the packets are directly returned, however, the mobile station is required to perform a complicated process for retransmitting the communication start packets after the communication mode is switched to ad-hoc mode. The reason will be explained with reference to FIG. 16.

Figure 16:
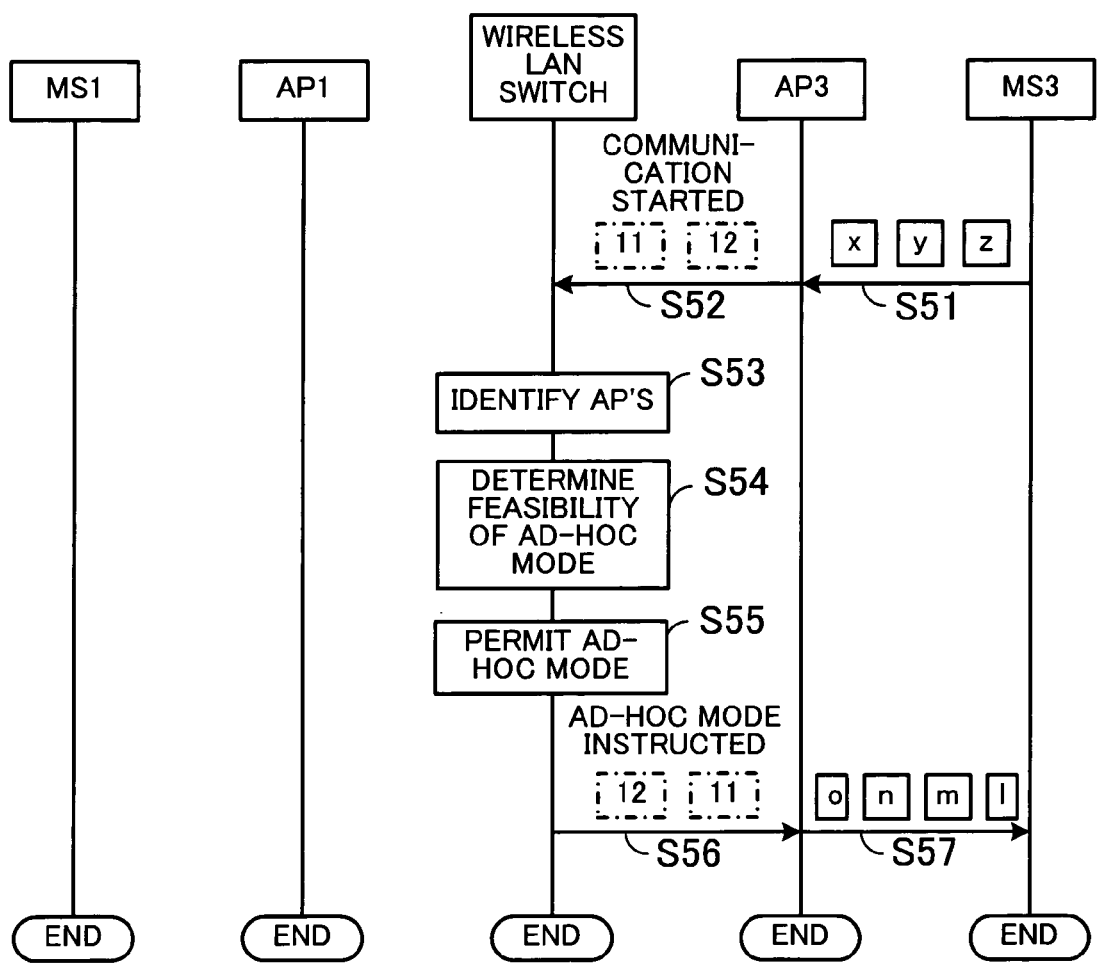
FIG. 16 is a sequence diagram illustrating the case where a retransmission process of a mobile station becomes complicated.

FIG. 16 is a sequence diagram illustrating the case where the retransmission process of a mobile station becomes complicated. In the figure, a mobile station 3 transmits, to an access point 3, data in MAC layer framing units (in the figure, x, y, and z) of the wireless LAN (Step S51). On receiving the MAC layer frames of the wireless LAN, the access point 3 transmits, to the wireless LAN switch, the data in framing units (in the FIGS. 11 and 12) of the wired Ethernet, for example (Step S52). When transmitting the communication start packets to the wireless LAN switch with the headers replaced, the access point 3 may possibly, though not necessarily, change the framing units. Whether the framing units are changed or not depends upon the implementation of the access point 3.

On receiving the communication start packets, the wireless LAN switch determines whether or not the mode of communication should be switched to ad-hoc mode. It is assumed here that the wireless LAN switch permits the switching of the communication mode to ad-hoc mode (Steps S53 to S55). Steps S53 to S55 are respectively identical with Steps S3 to S5 shown in FIG. 8, and therefore, detailed description thereof is omitted.

The wireless LAN switch then transmits the ad-hoc mode switching instruction, in which the received communication start packets (in the FIGS. 11 and 12) are included, to the access point 3 (Step S56). The access point 3 subjects the received communication start packets to the wireless LAN framing process and transmits, to the mobile station 3, the ad-hoc mode switching instruction in MAC layer framing units (in the figure, l, m, n and o) of the wireless LAN (Step S57).

In conventional communications between a mobile station and an access point, MAC frames exchanged across the wireless LAN each include a sequence number in case of loss of frames in the process of transfer between the mobile station and the access point, and the mobile station uses the sequence numbers for the management of the frames. In the case of FIG. 16, the mobile station 3 transmits the communication start packets in the framing units x, y, and z (e.g., with the sequence numbers x, y, and z, respectively), but it thereafter receives the communication start packets in the framing units l, m, n, and o (e.g., with the sequence numbers l, m, n, and o, respectively). Since the received communication start packets have sequence numbers different from those managed by the mobile station 3, it is difficult for the mobile station to determine whether all of the communication start packets transmitted therefrom have been received or not during the process of retransmitting the communication start packets, making the retransmission process complicated.

To clear the difficulty, the possibility of framing units being changed by the access point is eliminated so that the wireless LAN MAC layer frames may be transmitted intact to the wireless LAN switch. The wireless LAN switch transmits the communication start packets in a manner such that the packets are carried by the ad-hoc mode switching instruction with the sequence numbers retained. Consequently, a tunnel is created between the wireless LAN switch and the access point, whereby the mobile station can receive, from the wireless LAN switch, the communication start packets with sequence numbers which are identical to those assigned to the communication start packets by the mobile station when transmitting the packets, thereby preventing the retransmission process from becoming complicated.

Figure 17:
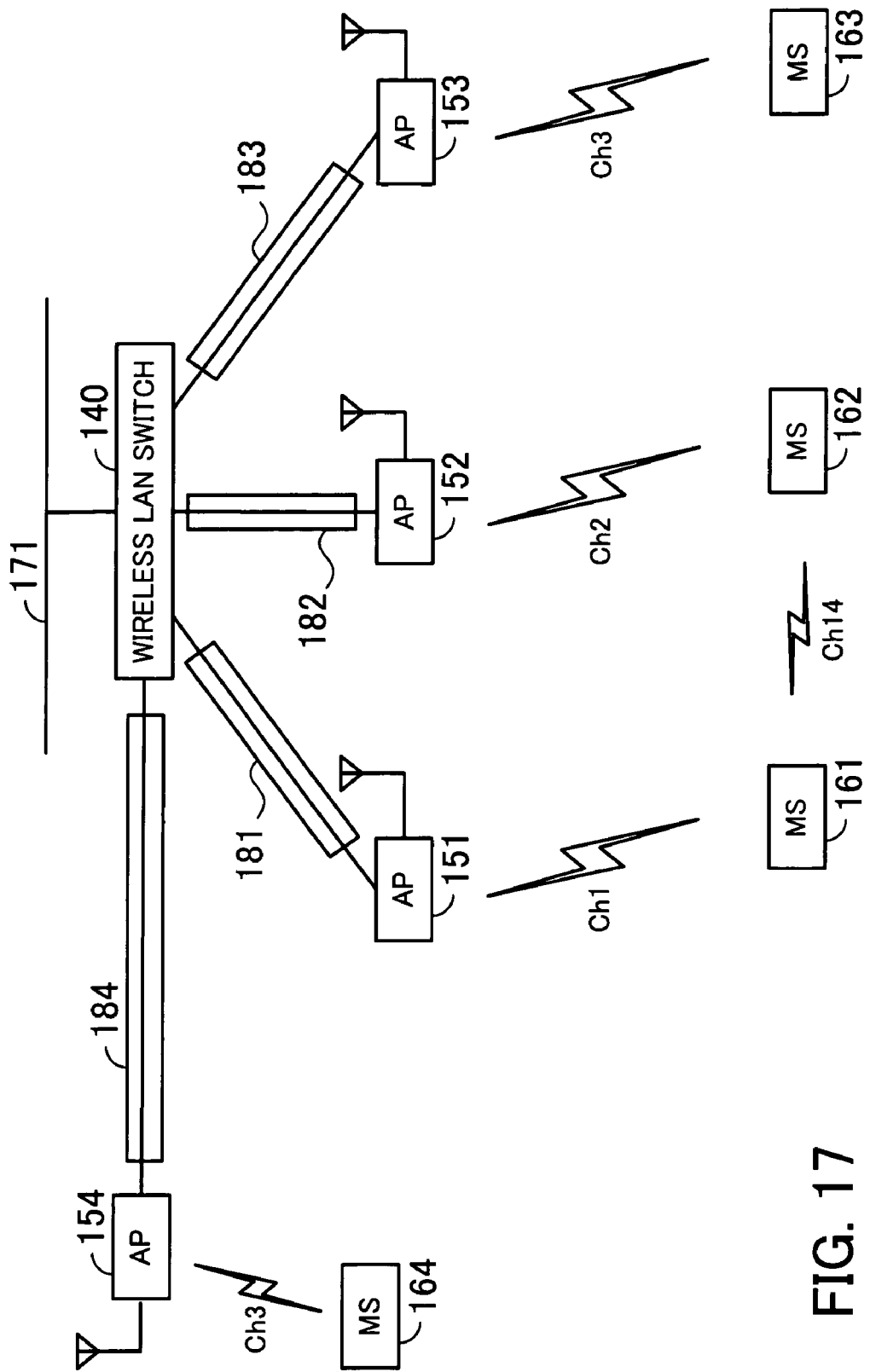
FIG. 17 shows an exemplary system configuration comprising a wireless LAN switch of a fourth embodiment, access points, and mobile stations.

FIG. 17 shows an exemplary system configuration comprising a wireless LAN switch of the fourth embodiment, access points, and mobile stations. As illustrated, the wireless LAN switch 140 is connected, for example, to a wired Ethernet backbone network 171. Also, the wireless LAN switch 140 is connected by wire with access points 151 to 154. Tunnels 181 to 184 are established between the wireless LAN switch 140 and the respective access points 151 to 154.

The access points 151 to 154 communicate with respective mobile stations 161 to 164 by wireless. Also, the mobile stations 161 and 162, for example, communicate with each other in ad-hoc mode.

The wireless LAN switch 140 receives, from the mobile station 161 via the access point 151, communication start packets in MAC layer framing units (e.g., framing units a, b, and c) of the wireless LAN. Then, the wireless LAN switch 140 transmits an ad-hoc mode switching instruction including the communication start packets to the mobile station 161 while retaining the sequence numbers of the wireless LAN MAC layer frames. It is not essential to retain the individual frame lengths at this time because the mobile station 161 can start communication in ad-hoc mode with ease so long as the sequence numbers are protected.

The following describes a message which is transmitted from the wireless LAN switch 140 to the mobile stations 161 to 164 when the communication mode is switched from infrastructure mode to ad-hoc mode.

Figure 18:
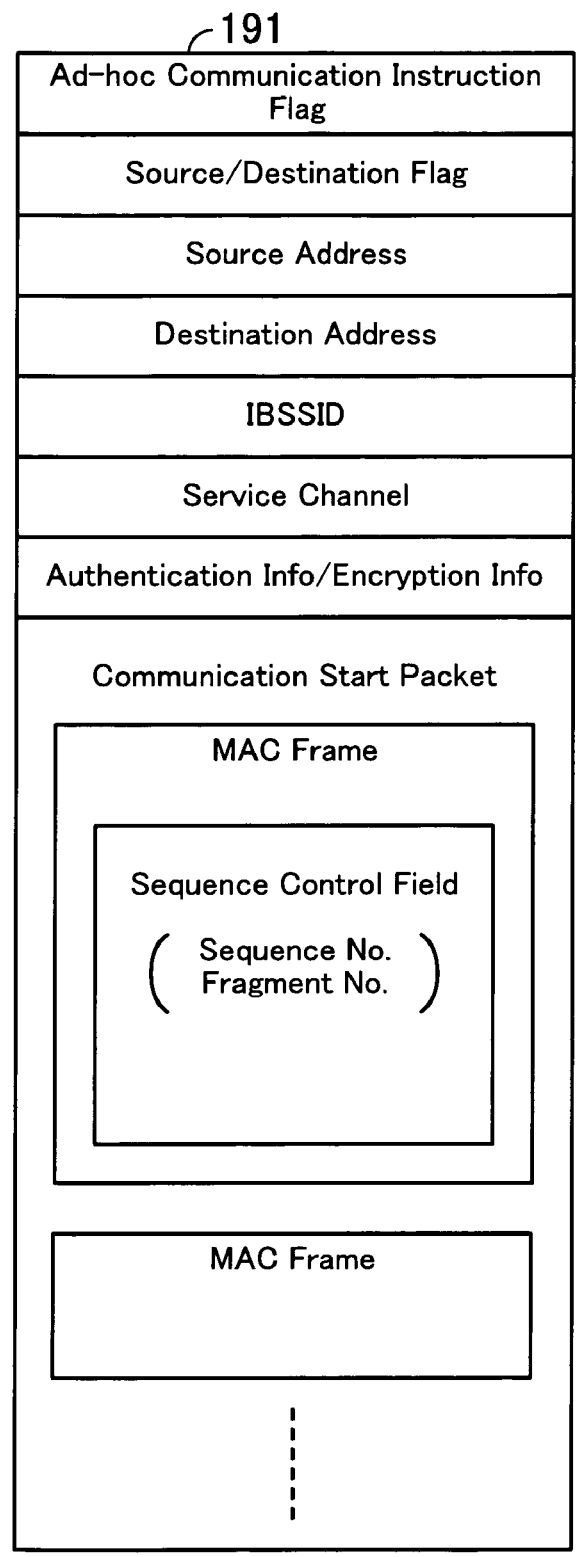
FIG. 18 shows the data format of a message transmitted at the time of switching communication mode to ad-hoc mode.

FIG. 18 shows the data format of an ad-hoc mode switching instruction message 191 transmitted when the communication mode is switched to ad-hoc mode. In the following, only the difference between the message 191 and the ad-hoc mode switching instruction message 83 shown in FIG. 5 will be explained.

The ad-hoc mode switching instruction message 191 contains, in the field "Communication Start Packet", a plurality of wireless LAN MAC frames (communication start packets). As shown in the figure, each MAC frame includes a sequence control field containing a sequence number and a fragment number. A MAC frame can be uniquely identified by the combination of the sequence and fragment numbers, and thus the combination serves as the so-called sequence number. The aforementioned sequence number also signifies the combination of sequence and fragment numbers.

It is possible that the wireless LAN switch 140 transmits, as the communication start packets, a plurality of wireless LAN MAC frames, but it is not essential that all of the wireless LAN MAC frames should be carried by a single ad-hoc mode switching instruction message 191. The MAC frames may be segmented to be encapsulated into a plurality of ad-hoc mode switching instruction messages 191 in accordance with the wired communication standards specifying the frame length etc.

The operation of the wireless LAN switch 140, access points 151 to 154 and mobile stations 161 to 164 will be now described.

Figure 19:
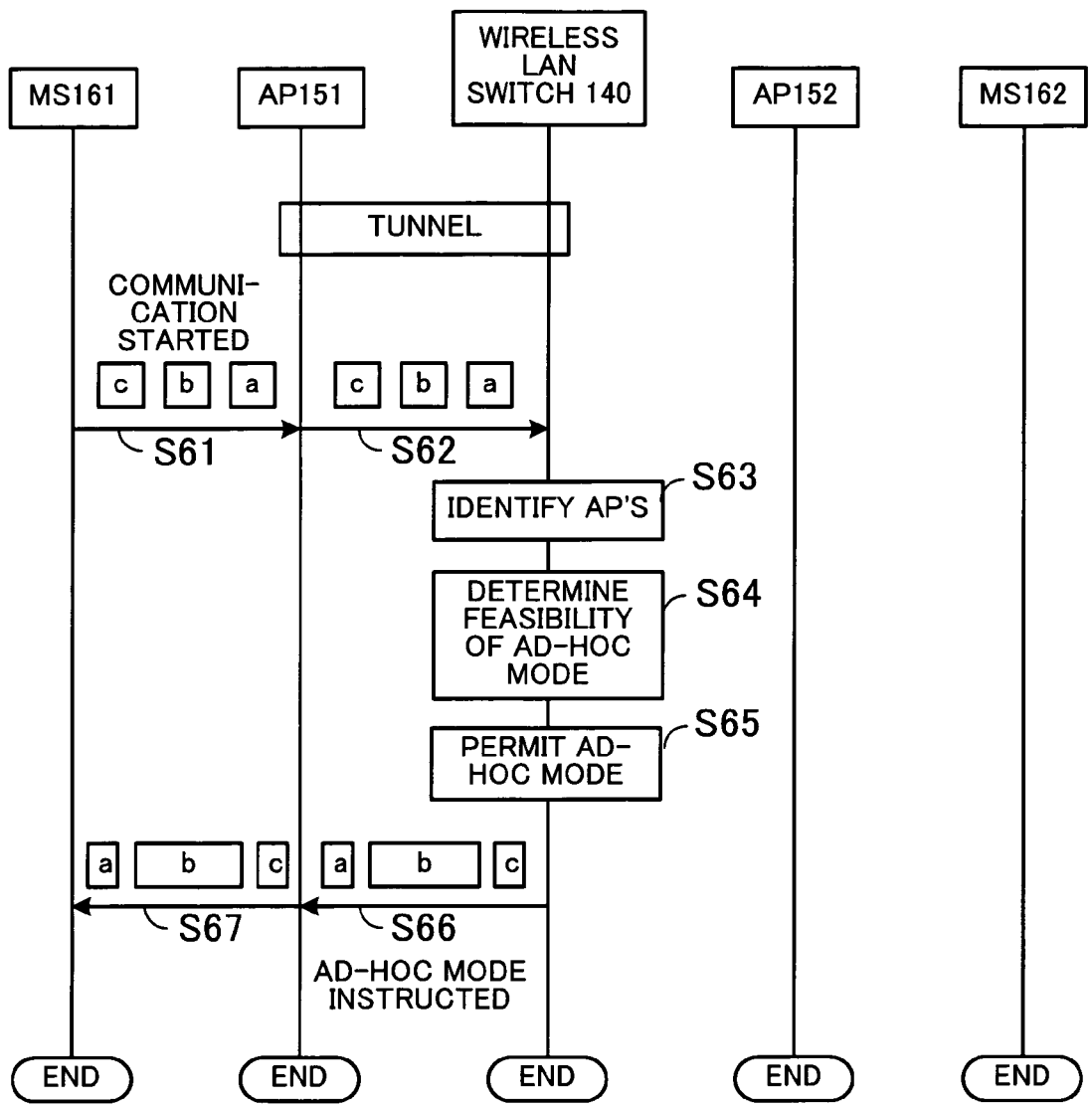
FIG. 19 is a sequence diagram illustrating the case where a tunnel is established between the wireless LAN switch and the access point.

FIG. 19 is a sequence diagram illustrating the case where a tunnel is established between the wireless LAN switch and the access point. The sequence illustrated in FIG. 19 is from the start of communication of the mobile station 161 with the mobile station 162 to the transmission of the ad-hoc mode switching instruction from the wireless LAN switch 140 to the mobile station 161.

The mobile station 161 transmits, to the access point 151, communication start packets in MAC layer framing units (in the figure, a, b, and c) of the wireless LAN (Step S61). The access point 151 encapsulates the communication start packets received from the mobile station 161, and transmits the resultant packets to the wireless LAN switch 140 (Step S62).

On receiving the communication start packets, the wireless LAN switch 140 determines whether or not the communication mode should be switched to ad-hoc mode. It is assumed here that the wireless LAN switch 140 permits the switching of the communication mode to ad-hoc mode (Steps S63 to S65). Steps S63 to S65 are respectively identical with Steps S3 to S5 shown in FIG. 8, and therefore, detailed description thereof is omitted.

The wireless LAN switch 140 transmits an ad-hoc mode switching instruction, in which the communication start packets (in the figure, a, b, and c) are included with their sequence numbers (e.g., sequence nos. a, b, and c) retained, to the mobile station 161 (Steps S66, S67).

In the illustrated sequence, it is not essential to maintain the frame lengths of the individual frames. This is because the mobile station 161 can start communication in ad-hoc mode with ease if only the sequence numbers are protected. For example, as seen from Step S66 in FIG. 19, the frame length of the frame b is lengthened as a result of the wireless LAN MAC layer framing process of the wireless LAN switch 140. The wireless LAN switch 140 changes the frame length because, for example, the boundary of the frame needs to be adjusted so as to match the frame length specified by wired communication standards.

The following describes a sequence wherein the ad-hoc mode switching instruction is transmitted without changing the frame length.

Figure 20:
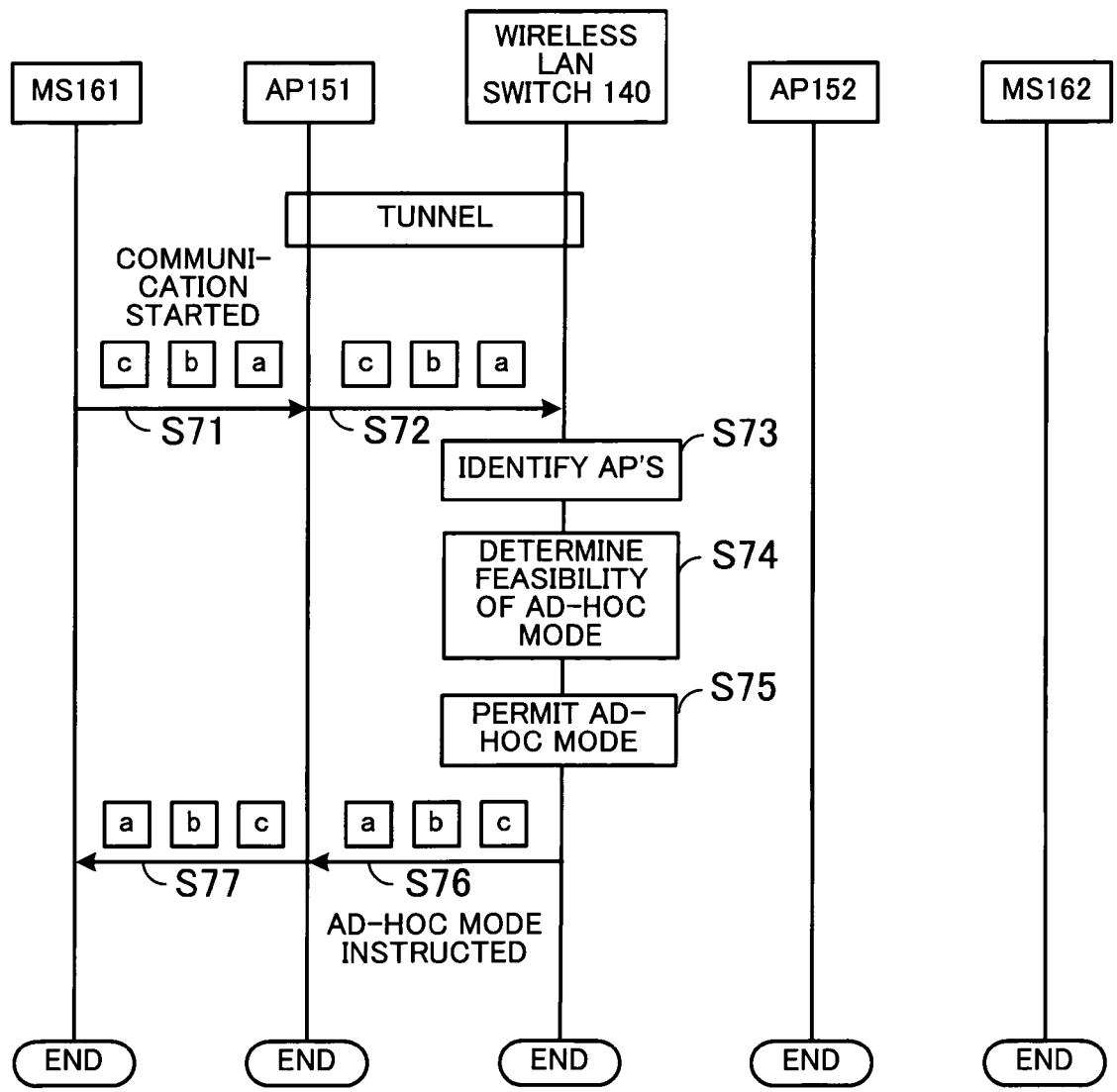
FIG. 20 is a sequence diagram illustrating another exemplary case where a tunnel is established between the wireless LAN switch and the access point.
Figure 21:
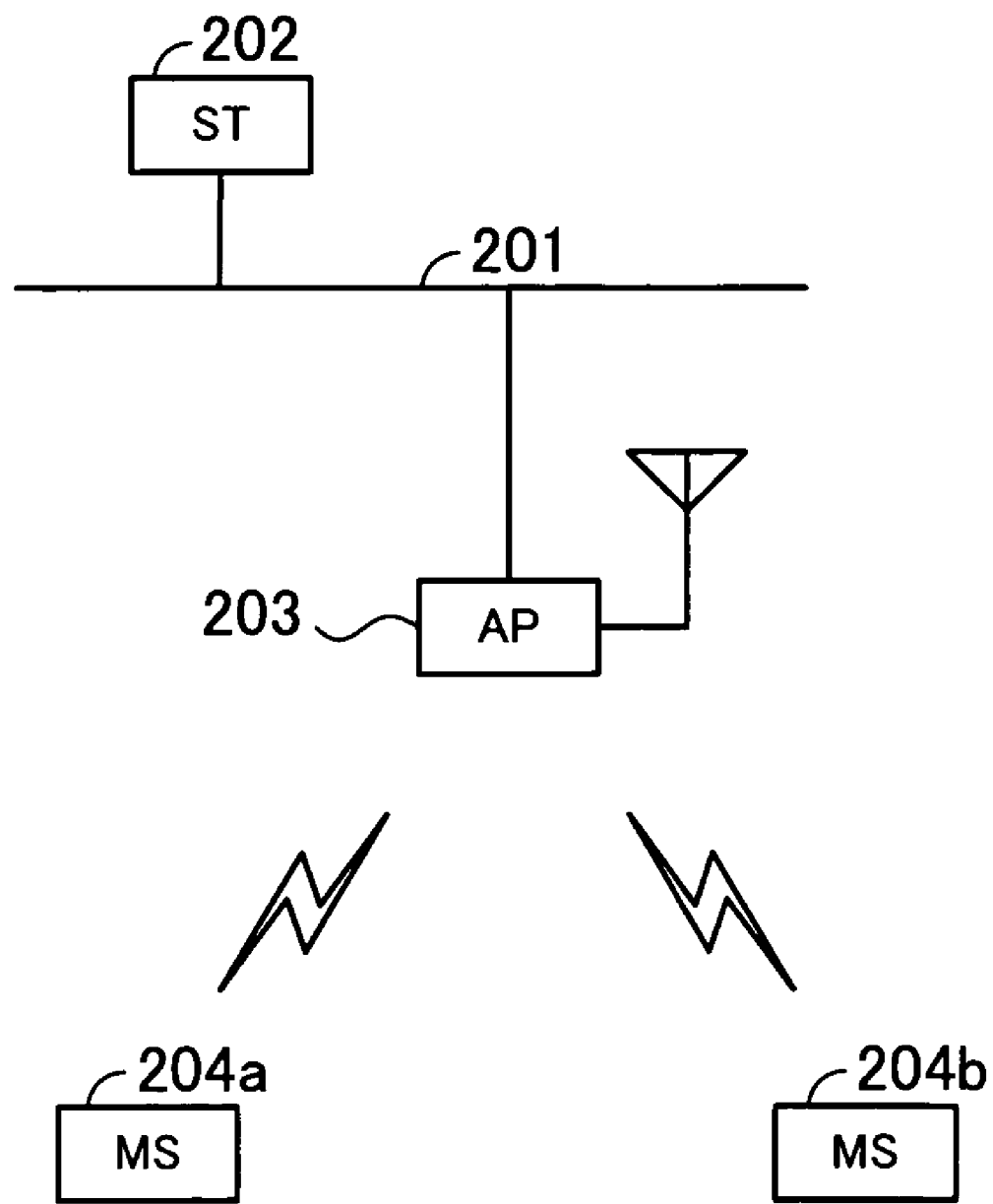
FIG. 21 shows an exemplary network operating in infrastructure mode.
Figure 22:
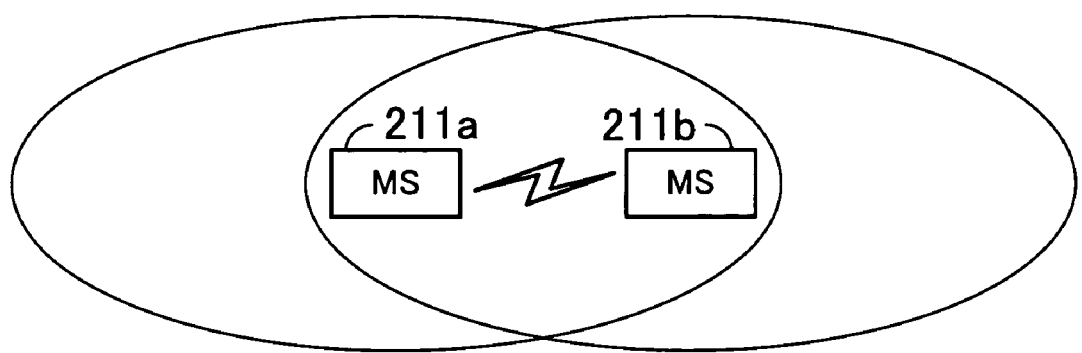
FIG. 22 shows an exemplary network operating in ad-hoc mode.
Figure 23:
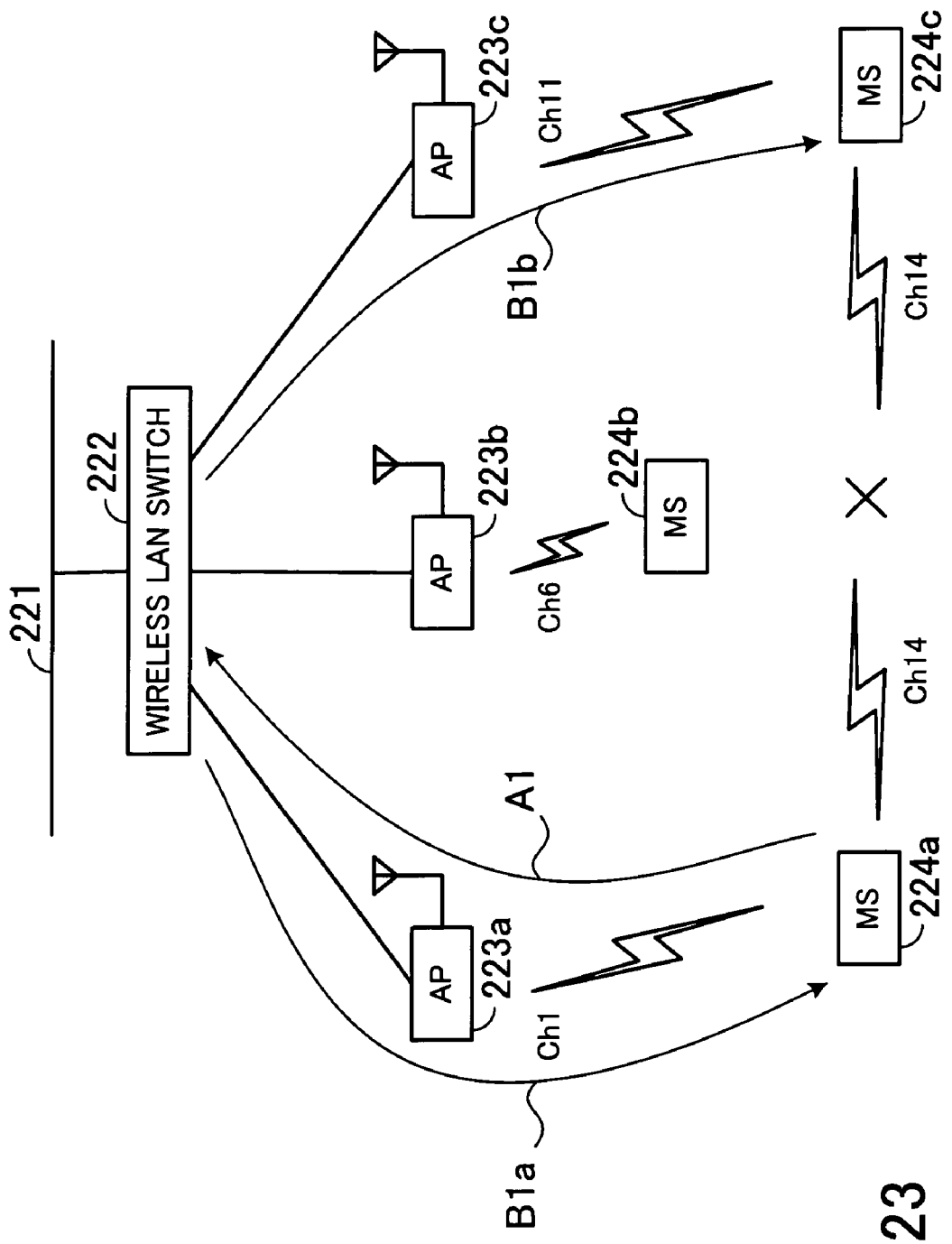
FIG. 23 illustrates switching of communication mode by a wireless LAN switch.

FIG. 20 is a sequence diagram illustrating another exemplary case where a tunnel is established between the wireless LAN switch and the access point. The sequence illustrated in FIG. 20 is from the start of communication of the mobile station 161 with the mobile station 162 to the transmission of the ad-hoc mode switching instruction from the wireless LAN switch 140 to the mobile station 161.

The mobile station 161 transmits, to the access point 151, communication start packets in MAC layer framing units (in the figure, a, b, and c) of the wireless LAN (Step S71). The access point 151 encapsulates the communication start packets received from the mobile station 161, and transmits the resultant packets to the wireless LAN switch 140 (Step S72).

On receiving the communication start packets, the wireless LAN switch 140 determines whether or not the communication mode should be switched to ad-hoc mode. It is assumed here that the wireless LAN switch 140 permits the switching of the communication mode to ad-hoc mode (Steps S73 to S75). Steps S73 to S75 are respectively identical with Steps S3 to S5 shown in FIG. 8, and therefore, detailed description thereof is omitted.

The wireless LAN switch 140 transmits an ad-hoc mode switching instruction, in which the communication start packets (in the figure, a, b, and c) are included with their sequence numbers (e.g., sequence nos. a, b, and c) retained, to the mobile station 161 (Steps S76, S77).

In the case of FIG. 20, the wireless LAN switch 140 transmits the received frames (in the figure, a, b, and c) in a manner such that the frames are carried by the ad-hoc mode switching instruction without their frame lengths changed. Thus, where the frame lengths need not be changed, it is naturally unnecessary to change the frame lengths. In this case, the wireless LAN switch 140 merely has the frames carried by the switching instruction, and therefore, the expression "the wireless LAN MAC layer framing process is performed" may not be appropriate. With the function of executing the framing process, however, the process of causing the switching instruction to carry the frames while maintaining the frame lengths can be performed as a subset. Accordingly, the framing process referred to in the above description should be interpreted as including also the process of causing the switching instruction to carry the frames while maintaining the frame lengths.

In this manner, a tunnel is established between the wireless LAN switch and the access point, and the wireless LAN MAC layer framing process is performed so as to retain the sequence numbers, whereby ad-hoc communication of the mobile stations can be started with ease.

In the wireless LAN device of the present invention, it is determined whether or not the access points with which terminals communicating in infrastructure mode are respectively associated are within each other's coverage of radio waves, and if the access points are within each other's coverage of radio waves, the mode of communication between the terminals is switched to ad-hoc mode.

Thus, if the access points are not within each other's coverage of radio waves, the communication between the terminals associated with the respective access points is not switched to ad-hoc mode, whereby failure in the switching from infrastructure mode to ad-hoc mode can be lessened.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wireless LAN device for controlling access points, comprising:
    a radio wave coverage storage unit to store radio wave coverage information on whether the access points are within each other's coverage of radio waves;
    a terminal information storage unit to store terminal information about terminals associated with the individual access points;
    a packet receiver to receive, via any of the access points, a packet transmitted from any of the terminals in infrastructure mode;
    an access point acquisition unit to look up the terminal information storage-unit, based on terminal information about an originating terminal and a destination terminal contained in the packet, to identify an access point with which the originating terminal is associated and a different access point with which the destination terminal is associated;
    a radio wave coverage decision unit to look up the radio wave coverage storage unit, to determine whether the different access points with which the originating terminal and the destination terminal are respectively associated are within each other's coverage of radio waves; and
    a communication mode switch to switch mode of communication between the originating terminal and the destination terminal to ad-hoc mode in accordance with a result of the determination by the radio wave coverage decision unit.

2. The wireless LAN device according to claim 1, wherein the communication mode switch causes the packet transmitted in the infrastructure mode to be included in one of ad-hoc mode switching instruction packets to be transmitted to the originating and destination terminals.

3. The wireless LAN device according to claim 2, wherein the communication mode switch establishes a tunnel with each of the access points and encapsulates the packet into the ad-hoc mode switching instruction packet in a manner such that a sequence number of the packet is retained.

4. The wireless LAN device according to claim 1, wherein, if failure information indicating that communication in the ad-hoc mode has failed is received from the originating or destination terminal after the mode of communication is switched to the ad-hoc mode, the communication mode switch switches the mode of communication between the originating and destination terminals to the infrastructure mode.

5. The wireless LAN device according to claim 1, further comprising a failure information storage unit to store the terminal information about the originating and destination terminals which failed in communication in the ad-hoc mode,
    wherein the communication mode switch prevents the mode of communication between the originating and destination terminals registered in the failure information storage unit from being switched to the ad-hoc mode.

6. The wireless LAN device according to claim 5, wherein the failure information storage unit deletes the terminal information about the originating and destination terminals after a lapse of a predetermined time period.

7. The wireless LAN device according to claim 1, further comprising a packet storage unit to store the packet transmitted in the infrastructure mode.

8. The wireless LAN device according to claim 7, further comprising a radio wave non-coverage information receiver to receive, from the terminals, radio wave non-coverage information which is indicative of non-coverage of radio waves between the terminals and which is generated based on RTS/CTS frames exchanged between the terminals and the access points; and
    a radio wave non-coverage information storage unit to store the radio wave non-coverage information, wherein the packet storage unit does not store the packet transmitted between the originating and destination terminals registered in the radio wave non-coverage information storage unit.

9. The wireless LAN device according to claim 1, wherein the radio wave coverage information stored in the radio wave coverage storage unit is generated through auto-calibration of the access points.

10. A communication mode switching method for a wireless LAN device which is adapted to control access points, comprising:
- receiving, via any of the access points, a packet transmitted from any of terminals in infrastructure mode;
- looking up stored terminal information about the terminals associated with the individual access points, based on terminal information about an originating terminal and a destination terminal contained in the packet, to identify an access point with which the originating terminal is associated and a different access point with which the destination terminal is associated;
- looking up stored radio wave coverage information on whether the access points are within each other's coverage of radio waves, to determine whether the different access points with which the originating terminal and the destination terminal are respectively associated are within each other's coverage of radio waves; and
- switching mode of communication between the originating terminal and the destination terminal to ad-hoc mode in accordance with a result of the determination.

11. A method for controlling a plurality of access points for communication, comprising:
- storing radio wave coverage information about coverage of radio waves amongst the access points;
- storing terminal information about communication terminals associated with the individual access points;
- receiving, via any of the access points, a packet transmitted from any of the communication terminals in infrastructure mode;
- looking up the stored terminal information, based on terminal information about an originating communication terminal and a destination communication terminal contained in the packet, to identify an access point with which the originating communication terminal is associated and an access point with which the destination communication terminal is associated;
- looking up the stored radio wave coverage information, to first determine whether the access points with which the originating communication terminal and the destination communication terminal are respectively associated are within each other's coverage of radio waves;
- switching mode of communication between the originating communication terminal and the destination communication terminal to ad-hoc mode in accordance with a result of the first determination;
- storing the packet transmitted in the infrastructure mode;
- receiving, from the communication terminals, radio wave non-coverage information which is indicative of non-coverage of radio waves between the terminals and which is generated based on RTS/CTS frames exchanged between the terminals and the access points; and
- storing the radio wave non-coverage information,
- wherein the storing the packet transmitted in the infrastructure mode does not store the packet transmitted between the originating and destination communication terminals, whose packet is in the received radio wave non-coverage information.

12. The wireless LAN device according to claim 1, wherein the communication mode switch switches the mode of communication from the infrastructure mode to the ad-hoc mode when the radio wave coverage decision unit has determined that the access points are within each other's coverage of radio waves.

* * * * *